United States Patent
Burger

(10) Patent No.: US 9,633,322 B1
(45) Date of Patent: Apr. 25, 2017

(54) ADJUSTMENT OF KNOWLEDGE-BASED AUTHENTICATION

(71) Applicant: ConsumerInfo.com, Inc., Costa Mesa, CA (US)

(72) Inventor: Michael Burger, Aliso Viejo, CA (US)

(73) Assignee: ConsumerInfo.com, Inc., Costa Mesa, CA (US)

(*) Notice: Subject to any disclaimer, the term of this patent is extended or adjusted under 35 U.S.C. 154(b) by 437 days.

(21) Appl. No.: 14/208,595

(22) Filed: Mar. 13, 2014

Related U.S. Application Data

(60) Provisional application No. 61/790,321, filed on Mar. 15, 2013.

(51) Int. Cl.
  *G06Q 40/00* (2012.01)
  *G06Q 10/06* (2012.01)

(52) U.S. Cl.
  CPC .............. *G06Q 10/0635* (2013.01)

(58) Field of Classification Search
  USPC ........................................... 705/35
  See application file for complete search history.

(56) References Cited

U.S. PATENT DOCUMENTS

| | | |
|---|---|---|
| 4,795,890 A | 1/1989 | Goldman |
| 4,977,595 A | 12/1990 | Ohta et al. |
| 5,351,293 A | 9/1994 | Michener et al. |
| 5,715,314 A | 2/1998 | Payne et al. |
| 5,745,654 A | 4/1998 | Titan |
| 5,754,632 A | 5/1998 | Smith |
| 5,819,226 A | 10/1998 | Gopinathan et al. |
| 5,884,289 A | 3/1999 | Anderson et al. |
| 5,903,830 A | 5/1999 | Joao et al. |
| 5,999,596 A | 12/1999 | Walker et al. |
| 6,021,943 A | 2/2000 | Chastain |
| 6,029,154 A | 2/2000 | Pettitt |
| 6,072,894 A | 6/2000 | Payne |
| 6,073,106 A | 6/2000 | Rozen et al. |
| 6,094,643 A | 7/2000 | Anderson et al. |
| 6,157,707 A | 12/2000 | Baulier et al. |

(Continued)

FOREIGN PATENT DOCUMENTS

| | | |
|---|---|---|
| EP | 1 028 401 | 8/2000 |
| GB | 2 392 748 | 3/2004 |

(Continued)

OTHER PUBLICATIONS

Sun, Hung-Min, "An efficient remote use authentication scheme using smart cards", IEEE Transactions on Consumer Electronics, vol. 46, No. 4, Nov. 2000.*

(Continued)

*Primary Examiner* — Amber A Misiaszek
(74) *Attorney, Agent, or Firm* — Knobbe, Martens, Olson & Bear, LLP

(57) ABSTRACT

Systems and methods are provided for adjustment of difficulty level, quantity, and/or other parameters of knowledge-based authentication. The questions may be asked of a consumer based on one or more generated risk scores associated with the consumer's behavior, which may be derived from information received from the consumer, a representative responsible for entering information regarding the consumer, and/or from the consumer's computing device.

16 Claims, 11 Drawing Sheets

(56) References Cited

U.S. PATENT DOCUMENTS

| | | |
|---|---|---|
| 6,253,202 B1 | 6/2001 | Gilmour |
| 6,254,000 B1 | 7/2001 | Degen et al. |
| 6,263,447 B1 | 7/2001 | French et al. |
| 6,282,658 B2 | 8/2001 | French et al. |
| 6,321,339 B1 | 11/2001 | French et al. |
| 6,327,578 B1 | 12/2001 | Linehan |
| 6,330,546 B1 | 12/2001 | Gopinathan et al. |
| 6,418,436 B1 | 7/2002 | Degen et al. |
| 6,463,533 B1 | 10/2002 | Calamera et al. |
| 6,473,740 B2 | 10/2002 | Cockril et al. |
| 6,496,936 B1 | 12/2002 | French et al. |
| 6,513,018 B1 | 1/2003 | Culhane |
| 6,581,059 B1 | 6/2003 | Barrett et al. |
| 6,597,775 B2 | 7/2003 | Lawyer et al. |
| 6,601,173 B1 | 7/2003 | Mohler |
| 6,607,136 B1 * | 8/2003 | Atsmon ............... G06F 21/34 235/487 |
| 6,615,193 B1 | 9/2003 | Kingdon et al. |
| 6,714,918 B2 | 3/2004 | Hillmer et al. |
| 6,714,944 B1 | 3/2004 | Shapiro et al. |
| 6,750,985 B2 | 6/2004 | Rhoads |
| 6,754,665 B1 | 6/2004 | Futagami et al. |
| 6,766,946 B2 | 7/2004 | Iida et al. |
| 6,845,448 B1 | 1/2005 | Chaganti et al. |
| 6,850,606 B2 | 2/2005 | Lawyer et al. |
| 6,857,073 B2 | 2/2005 | French et al. |
| 6,898,574 B1 | 5/2005 | Regan |
| 6,907,408 B2 | 6/2005 | Angel |
| 6,908,030 B2 | 6/2005 | Rajasekaran et al. |
| 6,934,858 B2 | 8/2005 | Woodhill |
| 6,950,858 B2 | 9/2005 | Ogami |
| 6,983,381 B2 | 1/2006 | Jerdonek |
| 7,028,013 B2 | 4/2006 | Saeki |
| 7,028,052 B2 | 4/2006 | Chapman et al. |
| 7,059,531 B2 | 6/2006 | Beenau et al. |
| 7,121,471 B2 | 10/2006 | Beenau et al. |
| 7,154,375 B2 | 12/2006 | Beenau et al. |
| 7,212,995 B2 | 5/2007 | Schulkins |
| 7,234,156 B2 | 6/2007 | French et al. |
| 7,234,160 B2 | 6/2007 | Vogel et al. |
| 7,237,267 B2 | 6/2007 | Rayes et al. |
| 7,246,067 B2 | 7/2007 | Austin et al. |
| 7,263,506 B2 | 8/2007 | Lee et al. |
| 7,277,875 B2 | 10/2007 | Serrano-Morales et al. |
| 7,303,120 B2 | 12/2007 | Beenau et al. |
| 7,310,611 B2 | 12/2007 | Shibuya et al. |
| 7,314,167 B1 | 1/2008 | Kiliccote |
| 7,343,149 B2 | 3/2008 | Benco |
| 7,356,516 B2 | 4/2008 | Richey et al. |
| 7,389,913 B2 | 6/2008 | Starrs |
| 7,428,509 B2 | 9/2008 | Klebanoff |
| 7,433,855 B2 | 10/2008 | Gavan et al. |
| 7,444,414 B2 | 10/2008 | Foster et al. |
| 7,458,508 B1 | 12/2008 | Shao et al. |
| 7,460,857 B2 | 12/2008 | Roach, Jr. |
| 7,478,157 B2 | 1/2009 | Bohrer et al. |
| 7,490,356 B2 | 2/2009 | Lieblich et al. |
| 7,503,489 B2 | 3/2009 | Heffez |
| 7,509,117 B2 | 3/2009 | Yum |
| 7,512,221 B2 | 3/2009 | Toms |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,575,157 B2 | 8/2009 | Barnhardt et al. |
| 7,581,112 B2 | 8/2009 | Brown et al. |
| 7,587,366 B2 | 9/2009 | Grim, III et al. |
| 7,603,701 B2 | 10/2009 | Gaucas |
| 7,606,725 B2 | 10/2009 | Robertson et al. |
| 7,610,216 B1 | 10/2009 | May et al. |
| 7,620,596 B2 | 11/2009 | Knudson et al. |
| 7,623,844 B2 | 11/2009 | Herrmann et al. |
| 7,653,600 B2 | 1/2010 | Gustin |
| 7,668,769 B2 | 2/2010 | Baker et al. |
| 7,689,487 B1 | 3/2010 | Britto et al. |
| 7,690,032 B1 | 3/2010 | Peirce |
| 7,698,445 B2 | 4/2010 | Fitzpatrick et al. |
| 7,708,190 B2 | 5/2010 | Brandt et al. |
| 7,739,139 B2 | 6/2010 | Robertson et al. |
| 7,747,494 B1 | 6/2010 | Kothari et al. |
| 7,761,379 B2 | 7/2010 | Zoldi et al. |
| 7,761,384 B2 | 7/2010 | Madhogarhia |
| 7,761,568 B1 | 7/2010 | Levi et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,778,885 B1 | 8/2010 | Semprevivo et al. |
| 7,797,725 B2 | 9/2010 | Lunt et al. |
| 7,801,811 B1 | 9/2010 | Merrell et al. |
| 7,802,104 B2 | 9/2010 | Dickinson |
| 7,805,362 B1 | 9/2010 | Merrell et al. |
| 7,827,115 B2 | 11/2010 | Weller et al. |
| 7,841,008 B1 | 11/2010 | Cole et al. |
| 7,849,014 B2 | 12/2010 | Erikson |
| 7,856,494 B2 | 12/2010 | Kulkarni |
| 7,865,958 B2 | 1/2011 | Lieblich et al. |
| 7,870,078 B2 | 1/2011 | Clark et al. |
| 7,975,299 B1 | 7/2011 | Balducci et al. |
| 7,979,908 B2 | 7/2011 | Millwee |
| 7,991,689 B1 | 8/2011 | Brunzell et al. |
| 8,001,042 B1 | 8/2011 | Brunzell et al. |
| 8,037,097 B2 | 10/2011 | Guo et al. |
| 8,060,424 B2 | 11/2011 | Kasower |
| 8,065,233 B2 | 11/2011 | Lee et al. |
| 8,104,679 B2 | 1/2012 | Brown |
| 8,214,262 B1 | 7/2012 | Semprevivo et al. |
| 8,234,498 B2 | 7/2012 | Britti et al. |
| 8,364,588 B2 | 1/2013 | Celka et al. |
| 8,725,613 B1 | 5/2014 | Celka et al. |
| 2001/0001877 A1 | 5/2001 | French et al. |
| 2002/0004736 A1 | 1/2002 | Roundtree et al. |
| 2002/0026519 A1 | 2/2002 | Itabashi et al. |
| 2002/0035684 A1 | 3/2002 | Vogel et al. |
| 2002/0077964 A1 | 6/2002 | Brody et al. |
| 2002/0087460 A1 | 7/2002 | Hornung |
| 2002/0099635 A1 | 7/2002 | Guiragosian |
| 2002/0099649 A1 | 7/2002 | Lee et al. |
| 2002/0111816 A1 | 8/2002 | Lortscher et al. |
| 2002/0120537 A1 * | 8/2002 | Morea ............... G06Q 30/02 705/35 |
| 2002/0157029 A1 | 10/2002 | French et al. |
| 2002/0161711 A1 | 10/2002 | Sartor et al. |
| 2002/0173994 A1 | 11/2002 | Ferguson, III |
| 2003/0009418 A1 | 1/2003 | Green et al. |
| 2003/0009426 A1 | 1/2003 | Ruiz-Sanchez |
| 2003/0050882 A1 | 3/2003 | Degen et al. |
| 2003/0061163 A1 | 3/2003 | Durfield |
| 2003/0065563 A1 | 4/2003 | Elliott et al. |
| 2003/0078877 A1 | 4/2003 | Beirne et al. |
| 2003/0097320 A1 | 5/2003 | Gordon |
| 2003/0097342 A1 | 5/2003 | Whittingtom |
| 2003/0115133 A1 | 6/2003 | Bian |
| 2003/0158751 A1 | 8/2003 | Suresh et al. |
| 2003/0177028 A1 | 9/2003 | Cooper et al. |
| 2003/0182214 A1 | 9/2003 | Taylor |
| 2003/0195859 A1 | 10/2003 | Lawrence |
| 2003/0225692 A1 | 12/2003 | Bosch et al. |
| 2004/0006488 A1 | 1/2004 | Fitall et al. |
| 2004/0015714 A1 | 1/2004 | Abraham et al. |
| 2004/0030649 A1 | 2/2004 | Nelson et al. |
| 2004/0044739 A1 | 3/2004 | Ziegler |
| 2004/0054619 A1 | 3/2004 | Watson et al. |
| 2004/0064401 A1 | 4/2004 | Palaghita et al. |
| 2004/0078324 A1 | 4/2004 | Lonnberg et al. |
| 2004/0111305 A1 | 6/2004 | Gavan et al. |
| 2004/0111375 A1 * | 6/2004 | Johnson ............... G06Q 20/06 705/64 |
| 2004/0117235 A1 | 6/2004 | Shacham |
| 2004/0123162 A1 | 6/2004 | Antell et al. |
| 2004/0153521 A1 | 8/2004 | Kogo |
| 2004/0158523 A1 | 8/2004 | Dort |
| 2004/0167793 A1 | 8/2004 | Masuoka et al. |
| 2004/0177046 A1 | 9/2004 | Ogram |
| 2004/0199462 A1 | 10/2004 | Starrs |

(56) References Cited

U.S. PATENT DOCUMENTS

| | | |
|---|---|---|
| 2004/0230448 A1 | 11/2004 | Schaich |
| 2004/0230527 A1 | 11/2004 | Hansen et al. |
| 2004/0243518 A1 | 12/2004 | Clifton et al. |
| 2004/0243832 A1 | 12/2004 | Wilf et al. |
| 2005/0005168 A1 | 1/2005 | Dick |
| 2005/0021476 A1 | 1/2005 | Candella et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0058262 A1 | 3/2005 | Timmins et al. |
| 2005/0065874 A1 | 3/2005 | Lefner et al. |
| 2005/0097051 A1 | 5/2005 | Madill, Jr. et al. |
| 2005/0097320 A1 | 5/2005 | Golan et al. |
| 2005/0119978 A1* | 6/2005 | Ates ............ G06Q 20/04 705/67 |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0166262 A1 | 7/2005 | Beattie et al. |
| 2005/0216582 A1 | 9/2005 | Toomey et al. |
| 2005/0256809 A1 | 11/2005 | Sadri |
| 2005/0273442 A1 | 12/2005 | Bennett et al. |
| 2005/0278542 A1 | 12/2005 | Pierson et al. |
| 2006/0010487 A1 | 1/2006 | Fierer et al. |
| 2006/0032909 A1 | 2/2006 | Seegar |
| 2006/0036870 A1 | 2/2006 | Dasari et al. |
| 2006/0041464 A1 | 2/2006 | Powers et al. |
| 2006/0059110 A1 | 3/2006 | Madhok et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0129481 A1 | 6/2006 | Bhatt et al. |
| 2006/0131390 A1 | 6/2006 | Kim |
| 2006/0155573 A1 | 7/2006 | Hartunian |
| 2006/0161435 A1 | 7/2006 | Atef et al. |
| 2006/0173776 A1 | 8/2006 | Shalley et al. |
| 2006/0178971 A1 | 8/2006 | Owen et al. |
| 2006/0202012 A1 | 9/2006 | Grano et al. |
| 2006/0204051 A1 | 9/2006 | Holland, IV |
| 2006/0218407 A1 | 9/2006 | Toms |
| 2006/0229961 A1 | 10/2006 | Lyftogt et al. |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0282660 A1* | 12/2006 | Varghese ............ G06Q 20/341 713/155 |
| 2007/0005508 A1 | 1/2007 | Chiang |
| 2007/0016522 A1 | 1/2007 | Wang |
| 2007/0038483 A1 | 2/2007 | Wood |
| 2007/0043577 A1 | 2/2007 | Kasower |
| 2007/0059442 A1 | 3/2007 | Sabeta |
| 2007/0072190 A1 | 3/2007 | Aggarwal |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094137 A1 | 4/2007 | Phillips et al. |
| 2007/0106582 A1 | 5/2007 | Baker et al. |
| 2007/0112667 A1 | 5/2007 | Rucker |
| 2007/0124256 A1 | 5/2007 | Crooks et al. |
| 2007/0174186 A1 | 7/2007 | Hokland |
| 2007/0192248 A1 | 8/2007 | West |
| 2007/0205266 A1 | 9/2007 | Carr et al. |
| 2007/0226093 A1 | 9/2007 | Chan et al. |
| 2007/0244807 A1 | 10/2007 | Andringa et al. |
| 2007/0250459 A1 | 10/2007 | Schwarz et al. |
| 2007/0261114 A1 | 11/2007 | Pomerantsev |
| 2007/0288355 A1 | 12/2007 | Roland et al. |
| 2007/0288360 A1 | 12/2007 | Seeklus |
| 2008/0010206 A1 | 1/2008 | Coleman |
| 2008/0010687 A1 | 1/2008 | Gonen et al. |
| 2008/0033742 A1 | 2/2008 | Bernasconi |
| 2008/0052244 A1 | 2/2008 | Tsuei et al. |
| 2008/0066188 A1 | 3/2008 | Kwak |
| 2008/0071682 A1 | 3/2008 | Dominguez |
| 2008/0077526 A1 | 3/2008 | Arumugam |
| 2008/0086759 A1 | 4/2008 | Colson |
| 2008/0103800 A1 | 5/2008 | Domenikos et al. |
| 2008/0103972 A1 | 5/2008 | Lanc |
| 2008/0109875 A1 | 5/2008 | Kraft |
| 2008/0114670 A1 | 5/2008 | Friesen |
| 2008/0115191 A1 | 5/2008 | Kim et al. |
| 2008/0126233 A1 | 5/2008 | Hogan |
| 2008/0147454 A1 | 6/2008 | Walker et al. |
| 2008/0162317 A1 | 7/2008 | Banaugh et al. |
| 2008/0167883 A1 | 7/2008 | Khazaneh |
| 2008/0175360 A1 | 7/2008 | Schwarz et al. |
| 2008/0183480 A1 | 7/2008 | Carlson et al. |
| 2008/0205655 A1 | 8/2008 | Wilkins et al. |
| 2008/0208873 A1 | 8/2008 | Boehmer |
| 2008/0255992 A1 | 10/2008 | Lin |
| 2008/0263058 A1 | 10/2008 | Peden |
| 2008/0281737 A1 | 11/2008 | Fajardo |
| 2008/0288299 A1 | 11/2008 | Schultz |
| 2008/0288382 A1 | 11/2008 | Smith et al. |
| 2008/0294540 A1 | 11/2008 | Celka et al. |
| 2008/0306750 A1 | 12/2008 | Wunder et al. |
| 2008/0319889 A1 | 12/2008 | Hammad |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0044279 A1 | 2/2009 | Crawford et al. |
| 2009/0055894 A1 | 2/2009 | Lorsch |
| 2009/0094674 A1 | 4/2009 | Schwartz et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0125369 A1 | 5/2009 | Kloostra et al. |
| 2009/0126013 A1 | 5/2009 | Atwood et al. |
| 2009/0138335 A1 | 5/2009 | Lieberman |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0164380 A1 | 6/2009 | Brown |
| 2009/0177529 A1 | 7/2009 | Hadi |
| 2009/0177562 A1 | 7/2009 | Peace et al. |
| 2009/0182653 A1 | 7/2009 | Zimiles |
| 2009/0199264 A1 | 8/2009 | Lang |
| 2009/0210241 A1 | 8/2009 | Calloway |
| 2009/0222308 A1 | 9/2009 | Zoldi et al. |
| 2009/0254476 A1 | 10/2009 | Sharma et al. |
| 2009/0260064 A1 | 10/2009 | Mcdowell et al. |
| 2009/0307778 A1 | 12/2009 | Mardikar |
| 2009/0328173 A1 | 12/2009 | Jakobson et al. |
| 2010/0011428 A1 | 1/2010 | Atwood et al. |
| 2010/0030677 A1 | 2/2010 | Melik-Aslanian et al. |
| 2010/0043055 A1 | 2/2010 | Baumgart |
| 2010/0094664 A1 | 4/2010 | Bush et al. |
| 2010/0094768 A1 | 4/2010 | Miltonberger |
| 2010/0100945 A1 | 4/2010 | Ozzie et al. |
| 2010/0114744 A1 | 5/2010 | Gonen |
| 2010/0114776 A1 | 5/2010 | Weller et al. |
| 2010/0121767 A1 | 5/2010 | Coulter et al. |
| 2010/0130172 A1 | 5/2010 | Vendrow et al. |
| 2010/0145836 A1 | 6/2010 | Baker et al. |
| 2010/0179906 A1 | 7/2010 | Hawkes |
| 2010/0205662 A1 | 8/2010 | Ibrahim et al. |
| 2010/0229245 A1 | 9/2010 | Singhal |
| 2010/0241535 A1 | 9/2010 | Nightengale et al. |
| 2010/0250411 A1 | 9/2010 | Ogrodski |
| 2010/0250955 A1* | 9/2010 | Trevithick ............ G06F 21/31 713/185 |
| 2010/0280914 A1 | 11/2010 | Carlson |
| 2010/0299262 A1 | 11/2010 | Handler |
| 2010/0325694 A1 | 12/2010 | Bhagavatula et al. |
| 2010/0332393 A1 | 12/2010 | Weller et al. |
| 2011/0004498 A1 | 1/2011 | Readshaw |
| 2011/0016533 A1 | 1/2011 | Zeigler et al. |
| 2011/0035788 A1 | 2/2011 | White et al. |
| 2011/0196791 A1 | 8/2011 | Dominguez |
| 2012/0017266 A1 | 1/2012 | DiChiara et al. |
| 2012/0030771 A1 | 2/2012 | Pierson et al. |

(56) References Cited

U.S. PATENT DOCUMENTS

| | | | | |
|---|---|---|---|---|
| 2012/0054095 | A1* | 3/2012 | Lesandro | G06Q 20/10 705/39 |
| 2012/0158574 | A1 | 6/2012 | Brunzell et al. | |
| 2012/0215682 | A1 | 8/2012 | Lent et al. | |
| 2013/0173450 | A1 | 7/2013 | Celka et al. | |

FOREIGN PATENT DOCUMENTS

| | | |
|---|---|---|
| WO | WO 99/60481 | 11/1999 |
| WO | WO 00/30045 | 5/2000 |
| WO | WO 02/27610 | 4/2002 |
| WO | WO 03/071388 | 8/2003 |
| WO | WO 2004/046882 | 6/2004 |
| WO | WO 2008/147918 | 12/2008 |

OTHER PUBLICATIONS

BlueCava, "What We Do", http://www.bluecava.com/what-we-do/, printed Nov. 5, 2012 in 3 pages.

Chores & Allowances. "Do Kids Have Credit Reports?" Oct. 15, 2007, http://choresandallowances.blogspot.com/2007/10/do-kids-have-credit-reports.html, pp. 5.

Cowie, Norman, "Warning Bells & 'The Bust-Out'", Business Credit, Jul. 1, 2000, pp. 5.

eFunds Corporation, "Data & Decisioning: Debit Report" printed Apr. 1, 2007, http://www.efunds.com/web/industry-solutions/financial-services/frm-debit-report/htm in 1 page.

"Fair Isaac Introduces Falcon One System to Combat Fraud at Every Customer Interaction", Business Wire, May 5, 2005, pp. 3.

"Fair Isaac Offers New Fraud Tool", National Mortgage News & Source Media, Inc., Jun. 13, 2005, pp. 2.

"FinExtra, Basepoint Analytics Introduces Predictive Technology for Mortgage Fraud", Oct. 5, 2005, pp. 3.

Gibbs, Adrienne; "Protecting Your Children from Identity Theft," Nov. 25, 2008, http://www.creditcards.com/credit-card-news/identity-ID-theft-and-kids-children-1282.php, pp. 4.

ID Theft Assist, "Do You Know Where Your Child's Credit Is?", Nov. 26, 2007, http://www.idtheftassist.com/pages/story14, pp. 3.

"Industry News, New Technology Identifies Mortgage Fraud: Basepoint Analytics Launches FraudMark", Inman News, American Land Title Association, Oct. 5, 2005, pp. 1.

International Search Report and Written Opinion for Application No. PCT/US2007/06070, dated Nov. 10, 2008.

Iovation, Device Identification & Device Fingerprinting, http://www.iovation.com/risk-management/device-identification printed Nov. 5, 2012 in 6 pages.

Jacob et al., A Case Study of Checking Account Inquiries and Closures in Chicago, The Center for Financial Services Innovation, Nov. 2006.

Lee, W.A.; "Experian, on Deal Hunt, Nets Identity Theft Insurer", American Banker: The Financial Services Daily, Jun. 4, 2003, New York, NY, 1 page.

Li et al., "Automatic Verbal Information Verification for User Authentication", IEEE Transactions on Speech and Audio Processing, vol. 8, No. 5, Sep. 2000, pp. 585-596.

LifeLock, "How LifeLock Works," http://www.lifelock.com/lifelock-for-people printed Mar. 14, 2008 in 1 page.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.

LifeLock, Various Pages, www.lifelock.com/, 2007.

Ogg, Erica, "Apple Cracks Down on UDID Use", http://gigaom.com/apple/apple-cracks-down-on-udid-use/ printed Nov. 5, 2012 in 5 Pages.

Sumner, Anthony, "Tackling The Issue of Bust-Out Fraud", Retail Banker International, Jul. 24, 2007, pp. 4.

Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.

Vamosi, Robert, "How to Handle ID Fraud's Youngest Victims," Nov. 21, 2008, http://news.cnet.com/8301-10789 3-10105303-57.html.

* cited by examiner

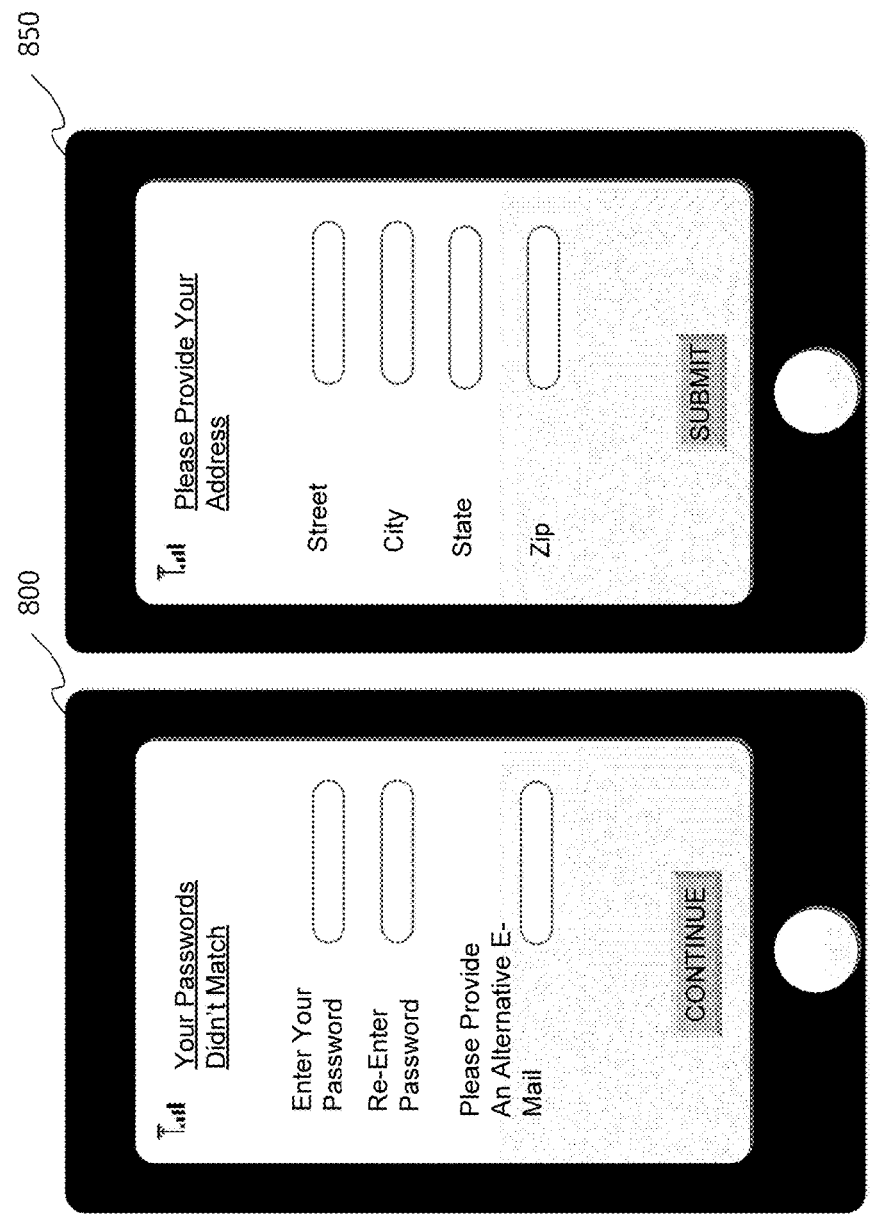

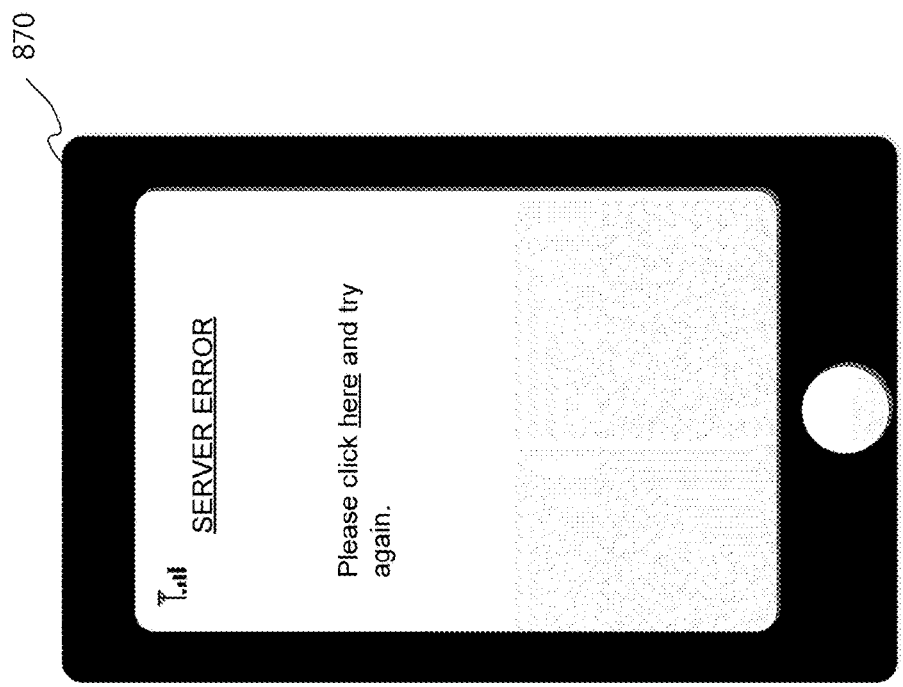

ADJUSTMENT OF KNOWLEDGE-BASED AUTHENTICATION

CROSS-REFERENCE TO RELATED APPLICATIONS

This application claims the benefit of priority under 35 U.S.C. §119(e) of U.S. Provisional Application No. 61/790,321, filed Mar. 15, 2013, the entirety of which is hereby incorporated herein by reference.

BACKGROUND

Consumers requesting a new account or enrollment for a new service or product may need to be authenticated. Authentication may involve generating and presenting questions to consumers regarding identity.

SUMMARY

Disclosed herein are systems and methods for setting authentication requirements for a consumer. In one embodiment, a computing system comprises: one or more computer processors and a computer readable storage configured to store instructions executable by the one or more computer processors in order to cause the computing system to: receive a request to set authentication requirements for a consumer in response to a request from the consumer to open a new account, wherein an identity of the consumer is unknown to operators of the computing system; determine device identification information associated with a device from which opening of the new account was requested by the consumer, the device identification information comprising one or more of device ID, device location, browser time zone, browser language settings, proxy settings, stated IP address, or real IP address; derive one or more behaviors of the consumer based on at least the device identification information, the one or more behaviors comprising one or more of a frequency of authentication requests for the consumer, total amount of time taken by the consumer to answer authentication questions, or whether the device location matches a location indicated by a browser executing on the device; calculate a risk of fraud associated with the consumer based on the one or more derived behaviors of the consumer; and determine authentication requirements for the consumer based on the calculated risk of fraud, wherein the authentication requirements indicate one or more of a number of questions the consumer is required to correctly answer, types of questions the consumer is required to answer, or a percentage of questions that must be correctly answered.

In accordance with another aspect of the disclosure, a non-transitory computer-readable storage medium comprises computer-executable instructions that direct a computing system to: receive a request to set authentication requirements for a consumer in response to a request from the consumer to open a new account, wherein an identity of the consumer is unknown to operators of the computing system; determine device identification information associated with a device from which opening of the new account was requested by the consumer, the device identification information comprising one or more of device ID, device location, browser time zone, browser language settings, proxy settings, stated IP address, or real IP address; derive one or more behaviors of the consumer based on at least the device identification information, the one or more behaviors comprising one or more of a frequency of authentication requests for the consumer, total amount of time taken by the consumer to answer authentication questions, or whether the device location matches a location indicated by a browser executing on the device; calculate a risk of fraud associated with the consumer based on the one or more derived behaviors of the consumer; and determine authentication requirements for the consumer based on the calculated risk of fraud, wherein the authentication requirements indicate one or more of a number of questions the consumer is required to correctly answer, types of questions the consumer is required to answer, or a percentage of questions that must be correctly answered.

In accordance with another aspect of the disclosure, a computer-implemented method of setting authentication requirements for a consumer comprises: receiving a request to set authentication requirements for a consumer in response to a request from the consumer to open a new account, wherein an identity of the consumer is unknown to operators of the computing system; determining device identification information associated with a device from which opening of the new account was requested by the consumer, the device identification information comprising one or more of device ID, device location, browser time zone, browser language settings, proxy settings, stated IP address, or real IP address; deriving one or more behaviors of the consumer based on at least the device identification information, the one or more behaviors comprising one or more of a frequency of authentication requests for the consumer, total amount of time taken by the consumer to answer authentication questions, or whether the device location matches a location indicated by a browser executing on the device; calculating a risk of fraud associated with the consumer based on the one or more derived behaviors of the consumer; and determining authentication requirements for the consumer based on the calculated risk of fraud, wherein the authentication requirements indicate one or more of a number of questions the consumer is required to correctly answer, types of questions the consumer is required to answer, or a percentage of questions that must be correctly answered.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 8A is an illustrative user interface that may be generated and presented to a consumer that is determined to be involved in potentially fraudulent authentication.

FIG. 8B is an illustrative user interface that may be generated and presented to a user who is determined to be involved in potentially fraudulent authentications for purposes of capturing information from the user.

FIG. 8C is an illustrative user interface that may be generated and presented to a user who is determined to be involved in potentially fraudulent authentication.

DETAILED DESCRIPTION

Authentication may involve detecting risk of fraudulent activity, such as stealing another consumer's identity and trying to open a new account under another person's name. Described herein are systems and methods for adjusting a difficulty level and or quantity of knowledge-based questions that may be asked of a consumer based on one or more generated risk scores associated with the consumer's behavior, which may be derived from information received from the consumer and/or from the consumers' computing device, for example.

Various embodiments of systems, methods, processes, and data structures will now be described with reference to the drawings. Variations to the systems, methods, processes, and data structures which represent other embodiments will also be described. Certain aspects, advantages, and novel features of the systems, methods, processes, and data structures are described herein. It is to be understood that not necessarily all such advantages may be achieved in accordance with any particular embodiment. Accordingly, the systems, methods, processes, and/or data structures may be embodied or carried out in a manner that achieves one advantage or group of advantages as taught herein without necessarily achieving other advantages as may be taught or suggested herein.

Example Knowledge-Based Authentication System Environment and Data Flow

Figure 1A:
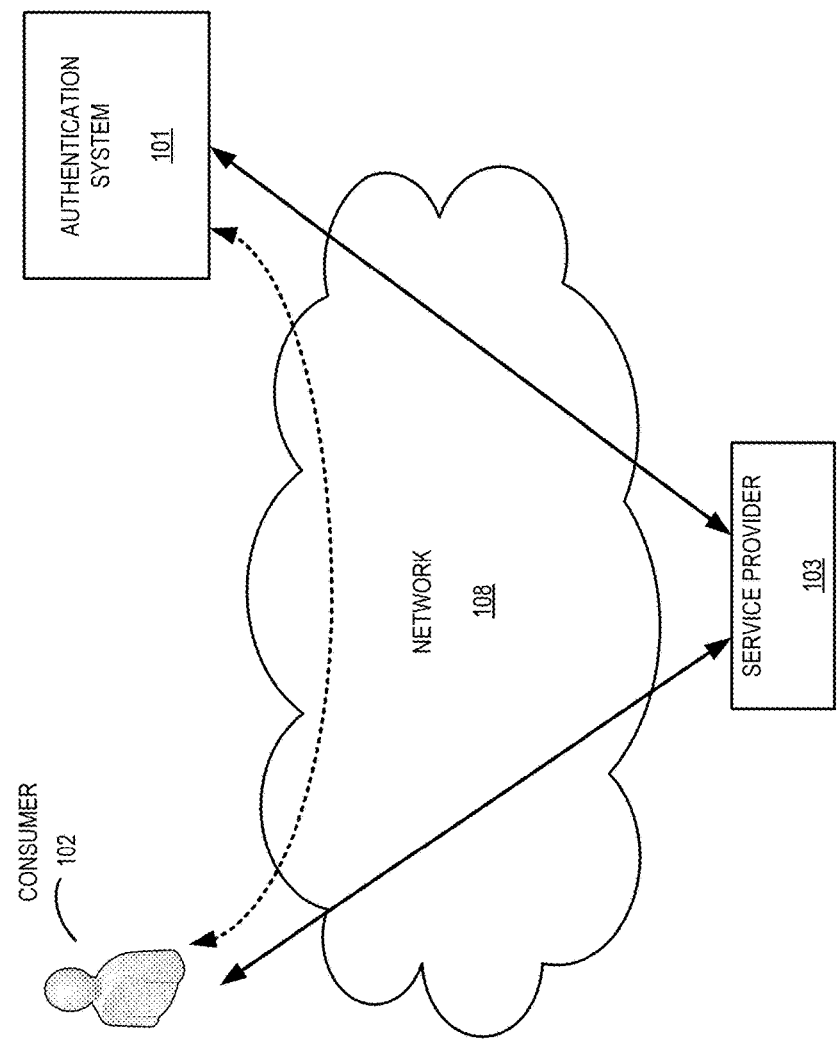
FIG. 1A is a flow diagram illustrating one embodiment of data flow in an illustrative operating environment for knowledge-based authentication.

FIG. 1A is a flow diagram illustrating one embodiment of data flow in an illustrative environment for a knowledge-based authentication system. One or more consumers may want to open an account. For example, a consumer 102 (where "consumer" refers to a computing device and/or an individual operating the computing device) may wish to install a new home security monitoring system, apply for a new credit card, join a fitness club, or open a credit monitoring account. The consumer may contact the service provider 103 (e.g., a representative or registration system of the home security system, credit card, fitness club, credit monitoring account, etc.), which may require the consumer 102 to be authenticated before accepting his new account opening request. In order to authenticate the consumer, the service provider 103 may send an authentication request to an authentication system 101, which may be configured to determine additional information required from the consumer 102 in order to authenticate the consumer and/or interface with the consumer either directly (via the network 108) or through the service provider 103 in order to authenticate the consumer (or determine that the consumer is not authenticated).

In some embodiments, consumers may submit information needed for authentication to the authentication system 101 such as at the request of the service provider 103.

Figure 1B:
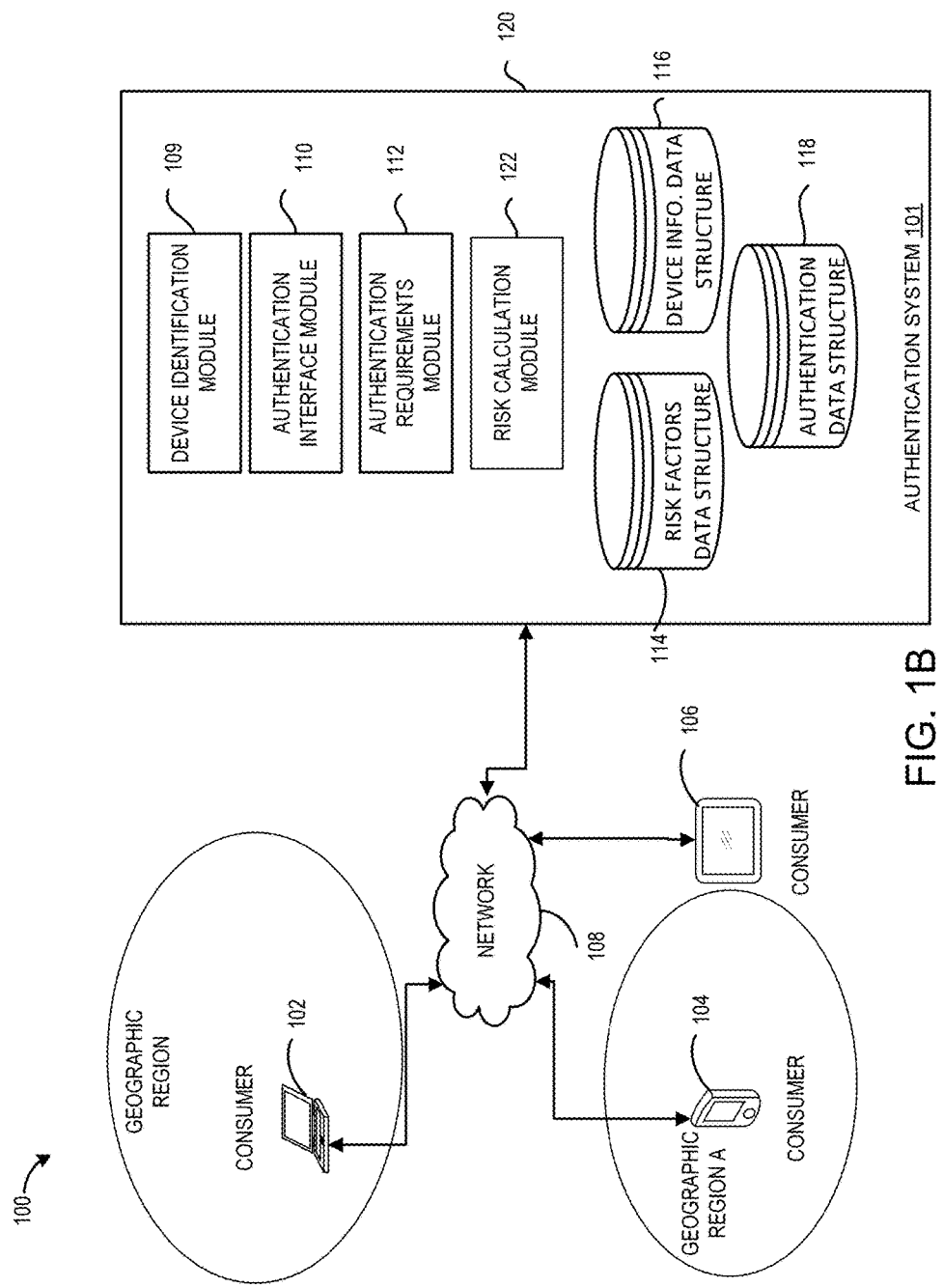
FIG. 1B is a block diagram illustrating an embodiment of system architecture in which multiple consumers 102, 104, 106 are in communication with an authentication processing system

FIG. 1B is a block diagram illustrating an example system architecture in which multiple consumers 102, 104, 106 are in communication with an authentication processing system 101, wherein the authentication processing system 101 is configured to authenticate the consumer. Depending on the embodiment, the authentication system 101 may include a device identification module 109, an authentication interface module 110, an authentication requirements module 112, and a risk calculation module 122.

According to some embodiments, the device identification module 109 may collect and process received device information. Device identification information may include device attributes, such as a device ID, device location, browser time zone, browser language settings, proxy settings, stated IP address, or real IP address. For example, a consumer 102 may be directed to a web interface to enroll in the home security monitoring service (that requires authentication). During the authentication process, information including internet usage, GPS location, and other device related data may be gathered from the consumer 102's mobile device 104 (e.g., using a script that runs in the background on the device and gathers the information), and the device identification module 109 may analyze such information to determine a location of the consumer 102's computing device. The device identification module 109 may also gather and analyze information that may reveal the consumer 102's real location instead of a location masked by an IP address. For example, if consumer 102's computing device communicates with the authentication system 101 through a Virtual Private Network ("VPN") or a proxy, then the real location of the consumer 102 may not be the same as an addressed associated with his IP address. The device identification module 109 may determine the real location of consumer 102 by analyzing current GPS data, historical GPS data, and relevant internet traffic indications such as the whether the device's IP address is associated with a known proxy server address.

In some embodiments, the authentication interface module 110 may generate one or more interfaces so that consumers may be asked questions that may be used to verify their identities. In other embodiments, authentication questions are asked of the consumer orally on a phone, for example. Depending on the embodiment, the authentication interface module 110 may also include device-aware parameter-submitting code (such as device id="NOKIA_ModelXYZ_OperatingSystem_ver1.1" user_agent="Mozilla/5.0 (Linux; U; OperatingSystem 1.1-update1; en-us; chn-big5) WebKit/525.10+(KHTML, like Gecko) Version/3.0.4 Mobile Safari/523.12.2"), in the generated user interfaces so that information about consumers' computing devices may be gathered. In some embodiments, the authentication interface module 110 may determine one or more behaviors of the consumer, such as based on the device identification information. For example, the behavior information may indicate a total number of times and/or frequency of a consumer requesting authentication (e.g., from the authentication system 101) during any given timeframe, such as for multiple services for which the authentication processing system 101 provides authentication services, a total time a consumer spends answering authentication questions presented to him or her, or whether the device location matches a location indicated by a browser executing on the device.

In some embodiments, the risk calculation module 122 may calculate a risk score or determine a risk level based on information received from a consumer and/or the consumer's computing or mobile device. For example, if a consumer states that she lives in Oregon but her device IP address indicates she lives in Siberia, then the risk calculation module 122 may increase the risk level (or risk score) associated with this consumer. In another example, if a consumer has approached the authentication system 101 three times (for enrollment in a same service or for enrollment in two or more different services) before but failed all three authentication attempts, the risk calculation module 122 may also increase the risk score or risk level associated with the consumer. Furthermore, in some embodiments, if a consumer's stated address is also associated with several other consumers (and/or consumers that are about the same age and/or have similar demographic information), the risk calculation module 122 may accordingly increase the risk score or risk level associated with the consumer.

According to some embodiments, the authentication requirements module 112 may generate and present various quantities and/or difficulties of questions to consumers, such as based on risk information generated by the risk calculation module 122. In addition, other criteria may be used for generating questions of various quantities or difficulty. For example, the risk calculation module 122 and/or the authentication requirements module 112 may adjust the authentication requirements for a consumer in response to determining that the consumer has taken a longer than normal time to answer authentication questions. Thus, during a single authentication session (e.g., a set of questions configured to authenticate a consumer), authentication requirements may be adjusted, such as by presenting more difficult (or less difficult) questions and/or additional (or fewer) questions. Additionally, risk score information may be stored and used in a later authentication request for a consumer or device, such as to adjust the authentication requirements.

Depending on the embodiment, the authentication system 101 may also include several data structures that store authentication related data. For example the authentication system 101 may include a risk factors data structure 114, which may store data and/or information related to potential risk factors, risk scores, and/or risk levels associated with respective consumers. The authentication system 101 may also include a device information data structure 116, which may in some embodiments store device information, location information associated with devices, IP addresses, MAC addresses, browser settings, proxy settings, and so forth. Depending on the embodiment, the authentication system 101 may also include an authentication data structure 118. The authentication data structure 118 may store information about consumers, computing devices, and so forth that may be used to generate authentication questions, which may be presented to consumers.

As illustrated in FIG. 1, the network 108 may comprise one or more of a LAN, WAN, and/or the Internet. The network 108 communicates with various modules, computing devices, and/or other electronic devices via wired or wireless communication links, and/or combination of wired and wireless communication links.

Example Computing System

Figure 2:
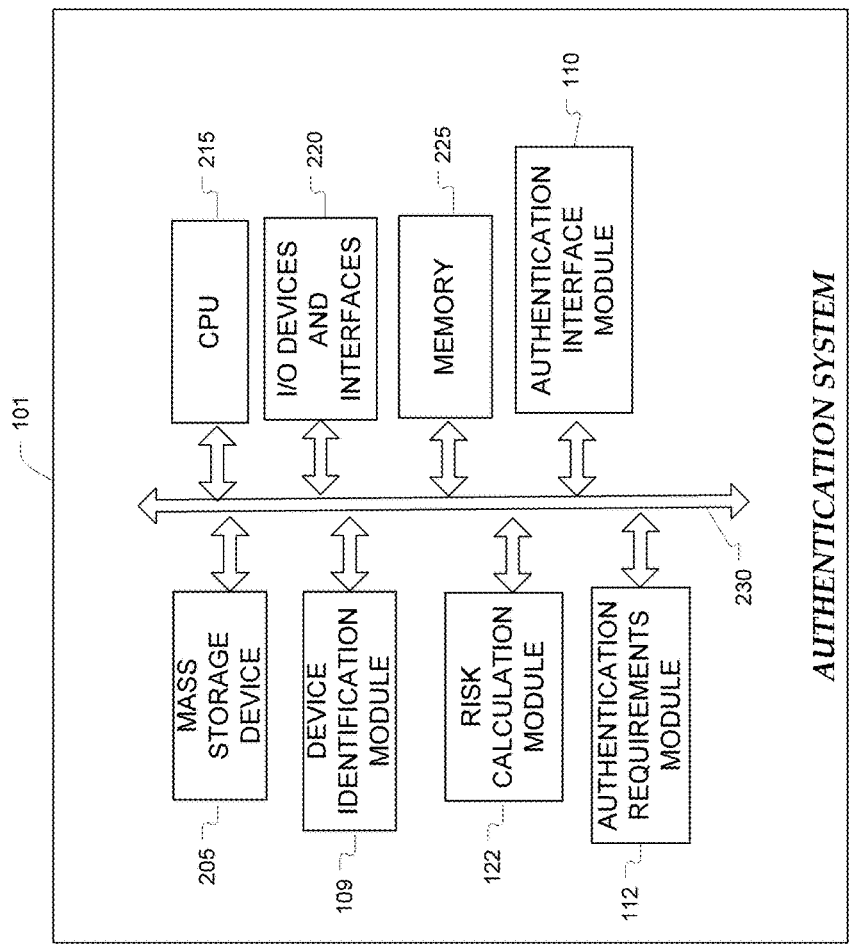
FIG. 2 is a block diagram illustrating one embodiment of a system for knowledge-based authentication.

FIG. 2 is a block diagram illustrating example components of the authentication system 101. While the components illustrated in FIG. 2 are discussed with reference to the authentication system 101, any other computing devices discussed and/or illustrated herein may include any or all of these same or similar components.

The authentication system 101 includes, for example, a computer that may be IBM, Macintosh, or Linux/Unix compatible or a server or workstation. In one embodiment, the authentication system 101 comprises a server, desktop computer, a tablet computer, or laptop computer, for example. In one embodiment, the exemplary authentication system 101 includes one or more central processing units ("CPUs") 215, which may each include a conventional or proprietary microprocessor. The authentication system 101 further includes one or more memory 225, such as random access memory ("RAM") for temporary storage of information, one or more read only memory ("ROM") for permanent storage of information, and one or more mass storage device 205, such as a hard drive, diskette, solid state drive, or optical media storage device. Typically, the modules of the authentication system 101 are connected to the computer using a standard based bus system 230. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of authentication system 101 may be combined into fewer components and modules or further separated into additional components and modules.

The authentication system 101 is generally controlled and coordinated by operating system software, such as Windows XP, Windows Vista, Windows 7, Windows 8, Windows Server, Unix, Linux, SunOS, Solaris, or other compatible operating systems. In Macintosh systems, the operating system may be any available operating system, such as MAC OS X. In other embodiments, the authentication system 101 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary authentication system 101 may include one or more commonly available input/output (I/O) devices and interfaces 220, such as a keyboard, mouse, touchpad, and printer. In one embodiment, the I/O devices and interfaces 220 include one or more display devices, such as a monitor, that allows the visual presentation of data to a user. More particularly, a display device provides for the presentation of GUIs, application software data, and multimedia presentations, for example. The authentication system 101 may also include one or more multimedia devices, such as speakers, video cards, graphics accelerators, and microphones, for example.

In the embodiment of FIG. 2, the I/O devices and interfaces 220 provide a communication interface to various external devices. In the embodiment of FIG. 2, for example, the authentication system 101 also includes the authentication interface module 110, the device identification module 109, the authentication requirements module 112, and the risk calculation module 122 (discussed above with reference to FIG. 1B) that may be stored in the mass storage device 205 and/or memory 225 as executable software codes that are executed by the CPU 215. These modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 103, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, one or more computing systems, data stores and/or modules described herein may be implemented using one or more open source projects or other existing platforms. For example, one or more computing systems, data stores and/or modules described herein may be implemented in part by leveraging technology associated with one or more of the following: Drools, Hibernate, JBoss, Kettle, Spring Framework, NoSQL (such as the database software implemented by MongoDB) and/or DB2 database software.

Example Method of Adjusting Knowledge-Based Authentication ("KBA")

Figure 3:
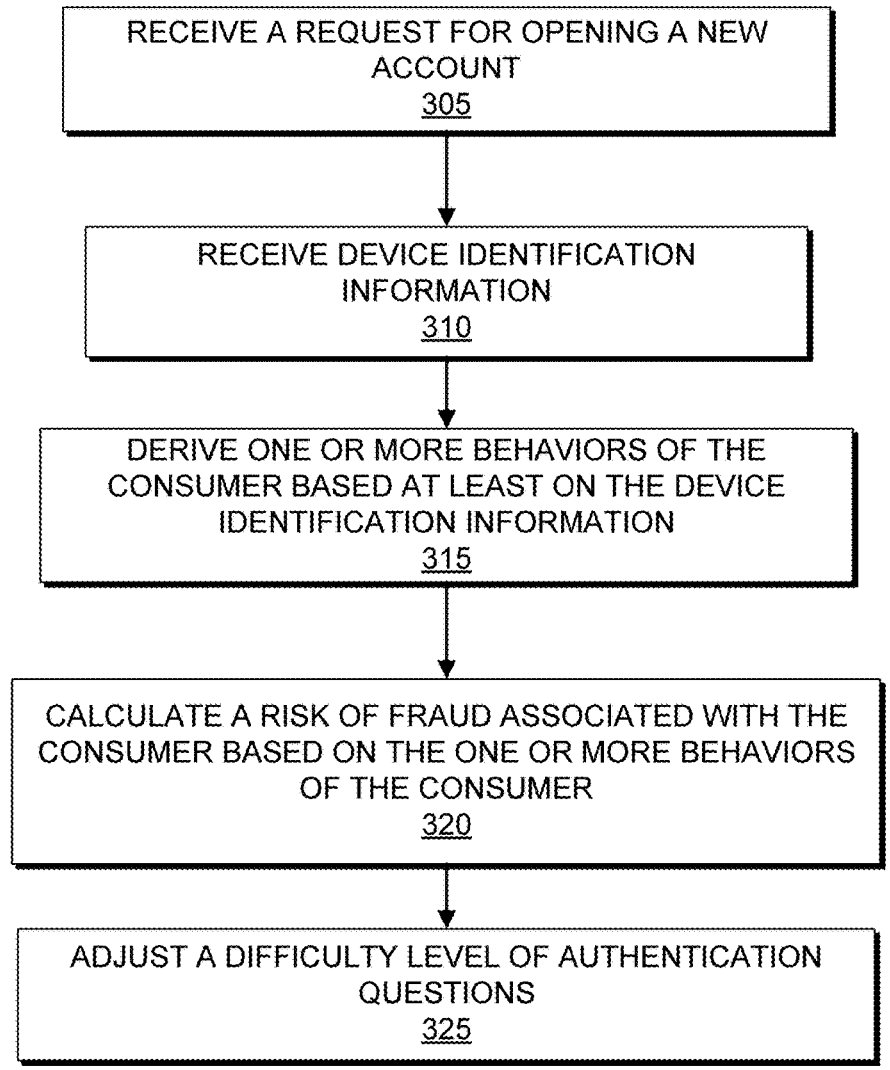
FIG. 3 is a flowchart that illustrates one embodiment of a process of authenticating the identity of a consumer.

FIG. 3 is a flowchart that illustrates one embodiment of a method of determining a difficulty level of authentication for a particular consumer. The method of FIG. 3 may be performed by the authentication system 101, such as the various modules of the authentication system 101. Alternatively, the method may be performed, in whole or part, by another computer device, such as partially by a consumer device and partially by the authentication system 101. For ease of description, the method will be discussed herein as being performed by the authentication system 101, but such description does not preclude performance of the method by multiple devices. Depending on the embodiment, the method may include fewer or additional blocks and/or the blocks may be performed in an order that is different than illustrated.

The method 300 begins at block 305, where a request for opening a new account is received. The new account may be an account of any type. For example, in some embodiments, the new account may be a credit line, satellite TV service, college admission, credit monitoring, or any other. In one embodiment, the particular consumer is anonymous to the authentication system 101 when the authentication request is received. For example, because the consumer is requesting a new account, the service provider likely doesn't already have identification information of the consumer.

In some embodiments, the request for opening a new account may come from a third party, such as a service provider, rather than directly from a consumer. For example, a retail store may initiate authentication of a consumer with the authentication system 100 in order to determine whether a new store credit account for the consumer that purchased some merchandise at the retail store should be opened. Similarly, an employer may send a request to an insurance company to request a new account be set up for one of its employees and, in response to the request, the insurance company may initiate authentication of the employee with the authentication system 100. In some other embodiments, the request for opening a new account may come directly from a consumer or a group of consumers. For example, a consumer may request authentication, which may then be provided to another entity (e.g., via an authentication token) as proof that authentication has been performed.

In some embodiments, a request for opening a new account may be sent via a post card, by mail, via a phone call, or other means besides on-line submission. For example, a consumer may submit paperwork needed to open a new account in a letter. A consumer may also initiate the request by a postcard and/or through a phone call. For example, the consumer may call into a call center and request to open a new account. A representative at the call center may enter information provided by the consumer via a use interface similar to ones disclosed herein to provide details regarding the consumer and the consumer's new account request.

The received request to open a new account may be received directly by a service provider, which may perform authentication itself. In some embodiments, the received request to open a new account may be received by a service provider and then forwarded to the authentication system 101. The authentication system 100 may then be put in direct contact with the consumer to complete the authentication, such as via a phone call, web form, email, and/or any other communication medium, and/or the authentication system 100 communicates with the consumer via the service provider, such as via a Iframe embedded in a website of the service provider.

The method 300 proceeds to block 310, where identification information regarding a consumer's computing device or mobile communication device is received. In some embodiments, the received information may include one or more IP addresses (real IP address, stated IP address, and so forth), device type, device manufacturer, device serial number, and so forth. For example, the information may be obtained by the device identification module 109 by embedding a script sent to a consumer's device and analyzing the information gathered from the script. For example, information received from the embedded script may include: "device name=MyPC, model name=PC123, Operating System=OS1.0, Application=MyBrowser, TouchScreenDevice=No, PhysicalScreenWidth=1024×768, IP address=100.100.100.100."

The method 300 proceeds to block 315, where one or more behaviors of the consumer may be derived based at least on the device identification information received. Such information may be used by the device identification module 109 to identify attributes of the device and/or consumer that may warrant an increased or decreased risk level associated with the consumer and, thus, an increased or decreased difficulty level associated with authentication of the consumer. For example, any inconsistencies, such as discrepancy between a real IP address and a stated IP address, may indicate an increased risk, which may lead to a greater quantity and/or difficulty level of authentication questions asked of the consumer. In some embodiments, other behaviors of the consumer may also include having already used the same device to attempt authentication unsuccessfully before. Depending on the embodiment, the behaviors of the consumer may be stored in a device information data structure 116.

The method 300 proceeds to block 320, where a risk of fraud associated with the consumer may be calculated based on the one or more behaviors of the consumer. For example, if a consumer's device has a stated IP address that is in Virginia, USA, but the device's unmasked real IP address revealed through software tools indicate that the device is in Thailand, then the risk calculation module 122 may use such information in the calculation of the risk of fraud involved with the consumer.

In some embodiments, if a consumer has already attempted authentication several times unsuccessfully, the risk calculation module 122 may also use such information as a factor in calculating the risk of fraud involved with the consumer.

Depending on the embodiment, the risk of fraud associated with the consumer may be represented as a risk score, which could be a numerical value. The risk of fraud may also be represented as a risk level, which may or may not be a numerical value.

The method 300 then proceeds to block 325, where a quantity and/or difficulty level of authentication questions may be determined and/or adjusted (e.g., from a default level) based on the calculated risk of fraud. In some embodiments, the adjustment is done by the authentication requirements module 112 using information stored in the risk factors data structure 114 and authentication data structure 118.

For example, the authentication system 101 may present questions of low levels of difficulty in response to a determination that the consumer has a low risk of fraud or a low risk score. The questions presented to the consumer may include basic questions that help verify the consumer's identity.

If, however, the consumer has a high risk of fraud or a high risk score, the questions presented to the consumer may include more difficult questions and/or more questions. For example, the authentication requirements module 112 may use information stored in the authentication data structure 118 to generate more difficult questions such as "Please name at least 2 public libraries next to your residence" and/or "Which of the following banks is one that you do not have an account with," and so forth. In one embodiment, the authentication questions are determined based on credit information of the consumer. For example, information regarding previous addresses, mortgage payments, credit card balance amounts, items purchased, etc., that typically no one other than the individual identified in the credit report (and possibly a spouse and a few other trusted individuals) would know about. Thus, asking questions about this information can help authenticate that the consumer really is who they say they are, in view of them knowing the information that is included on the credit report of the person that they are claiming to be. In other embodiments, various other sources of authentication questions may be used in order to ask questions of the consumer in an attempt to confirm that the consumer really is who they say they are.

In some embodiments, difficulty level of questions presented to a consumer may be dynamically adjusted. For example, if the authentication system 101 detects that the consumer has spent 5 minutes (or some other predetermined time) trying to answer a specific question, which may be considered too long by the authentication system 101, the authentication system 101 may generate an additional and/or a more difficult question for the consumer to answer. For example, if the consumer takes five minutes to provide his/her birthday (or other information that the consumer should be able to readily provide), the risk associated with the consumer may be increased and additional questions provided to that consumer may be of an increased difficulty and/or quantity.

Dealing with High Risk Consumers

In some embodiments, the system may automatically choose and present, based at least in part on difficulty level of questions, trick questions (also referred to as "false questions") to the consumers. For example, the false question may be: "What is the name of your daughter's first elementary school" when the system, in fact, knows that the identify used in requesting a new account does not have a daughter. In another example, the question may be: "Please indicate which branch of the ABCD Bank is the one that you visit most frequently" when in fact the system is aware that the identity used in requesting a new account does not have an account at the ABCD Bank.

In addition to false questions, the system may also provide false answers. For example, the system may mix real answers and false answers and present the mixed set of answers to both real and false questions to a consumer. In some embodiments, the false questions and false answers are generated randomly and automatically by the system. In some other embodiments, the false questions may also be ranked as to their respective levels of difficulty and presented to consumers by the system based on the chosen level of difficulty. For example, if a consumer is deemed high risk, the system may choose more difficult false questions and present them to the consumer. Examples of relatively easy authentication questions may be "What is your date of birth?" and "What is your mother's maiden name?" Examples of more difficult authentication questions include, for example, "What is your address from 1999-2001?" and "Did you have a car loan for approximately $40,000 in 2005 with CarBuyingCo?"

Depending on the embodiment, in response to the authentication system determining that a consumer is a high risk for fraud, the system may provide automatically generated error messages to the user. For example, instead of telling a user that he provided a wrong password but his email address was correct, which may risk giving a high-risk consumer too much information, the system may instead provide a message such as "Your information does not match our records," "Your mailing address is wrong," "Your age does not match our records," or even "the system has experienced serious problems, please try again later," etc. These intentionally false random error messages provide as little information as possible to a potentially fraudulent situation and do not aid the person who might be committing fraud in correcting any information and resubmitting a request.

In some embodiments, a combination of false questions and automatic random error messages may be used and no real question is presented to a consumer who has a particularly high risk of fraud. In some other embodiments, real questions, false questions, and automatic random error messages may all be used at the same time and presented to a user who was considered as a high risk of fraud. In some other embodiments, real questions, false questions, and automatic random error messages may be configured to have difficulty levels and presented to a consumer based on the consumer's level of risk for fraud. Further examples of dealing with high risk consumers are discussed below with reference to FIG. 7-9.

In some embodiments, besides adjusting the difficulty levels of questions, the authentication system 101 may also generate more questions that a consumer may have to answer correctly before the consumer can be authenticated.

Example User Interfaces

Figure 4:
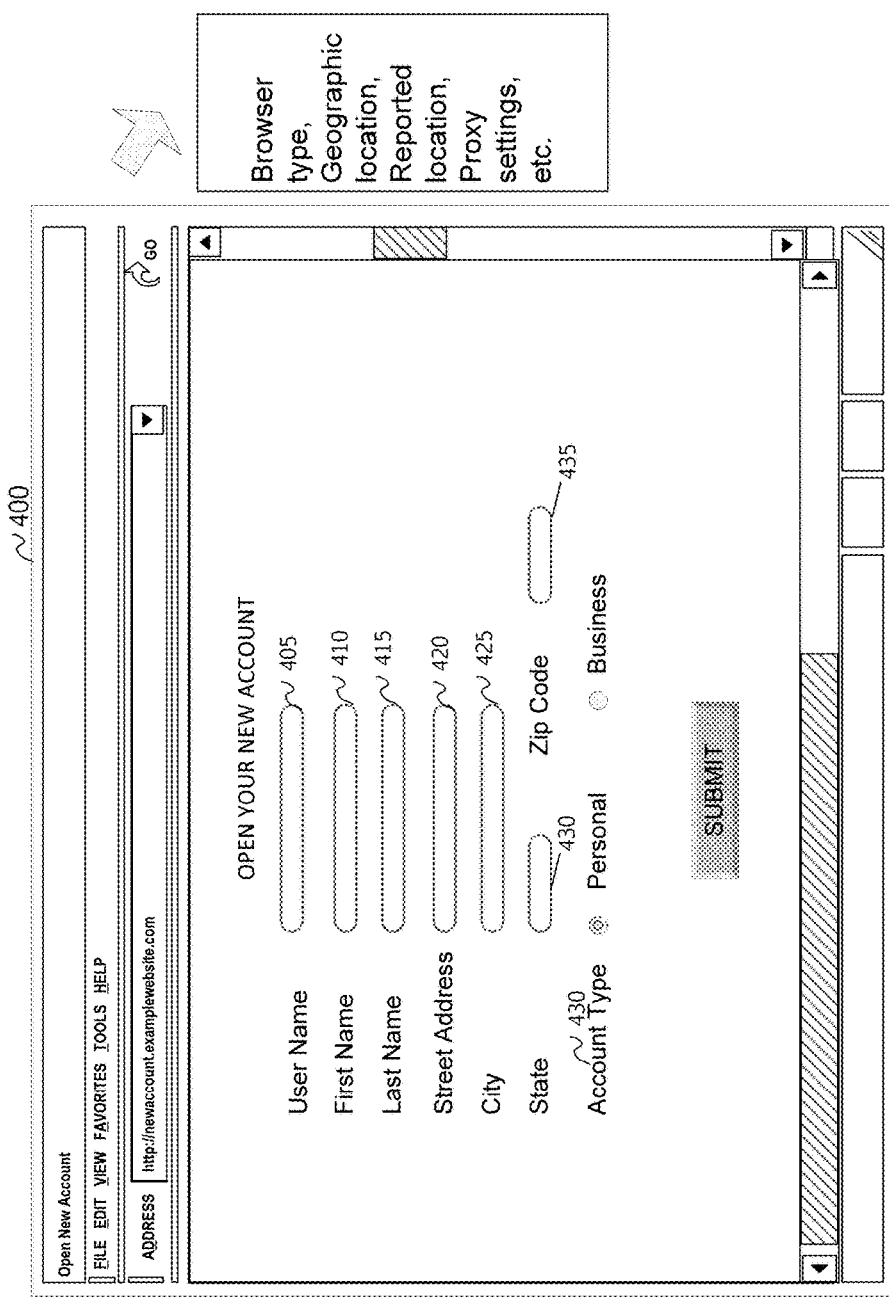
FIG. 4 is an illustrative user interface that may be generated and presented to a consumer, which includes questions presented to the consumer for the purpose of opening a new account and also tools that gather browser and/or computing device related information.

FIG. 4 is an illustrative user interface 400 that may be generated and presented to a consumer or a person who is tasked with entering information related to a consumer, which includes questions presented to the consumer for the purpose of opening a new account and also tools that gather browser and/or computing device related information. The authentication system 101 and/or the authentication interface module 110 may be used to implement systems and methods described in this disclosure.

In this embodiment, the user interface 400 gathers information from a consumer or a person responsible for entering information related to a consumer so that the consumer may start the process of authentication. The information gathered may include: user name 405, first name 410, last name 415, street address 410, city 425, state 430, zip code 435, and/or account type 430, which may be personal or business.

In some embodiments, the person responsible for entering information related to a consumer may be a representative of a call center who helps enter information for opening credit accounts. In some other embodiments, the person responsible for entering information related to a consumer may be a representative of a credit bureau, a retailer, a hospital, an insurance company, a fitness club, a potential employer, etc., who helps enter information for opening a new account.

In this example, the user interface 400 is presented in a browser. The authentication system 101, via the device identification module 109, may receive additional metadata and/or device related information. For example, information may be gathered when the user types in the text fields and/or when the user submits the information. The information may include, for example, browser type, geographic location, reported location, proxy settings, and so forth.

In some embodiments, if the browser type is a mobile phone browser, but the device information associated with the computing device indicates that the consumer uses a desktop computer, the risk calculation module 122 may use such information to increase the level of risk or increase a risk score associate with the consumer.

In addition, as discussed previously, if the computing device of the consumer has a real IP address discovered by the device identification module 109, but the consumer's stated IP address does not match the real IP address, then the risk calculation module 122 may also use such information to increase the level of risk or increase a risk score associate with the consumer.

Figure 5:
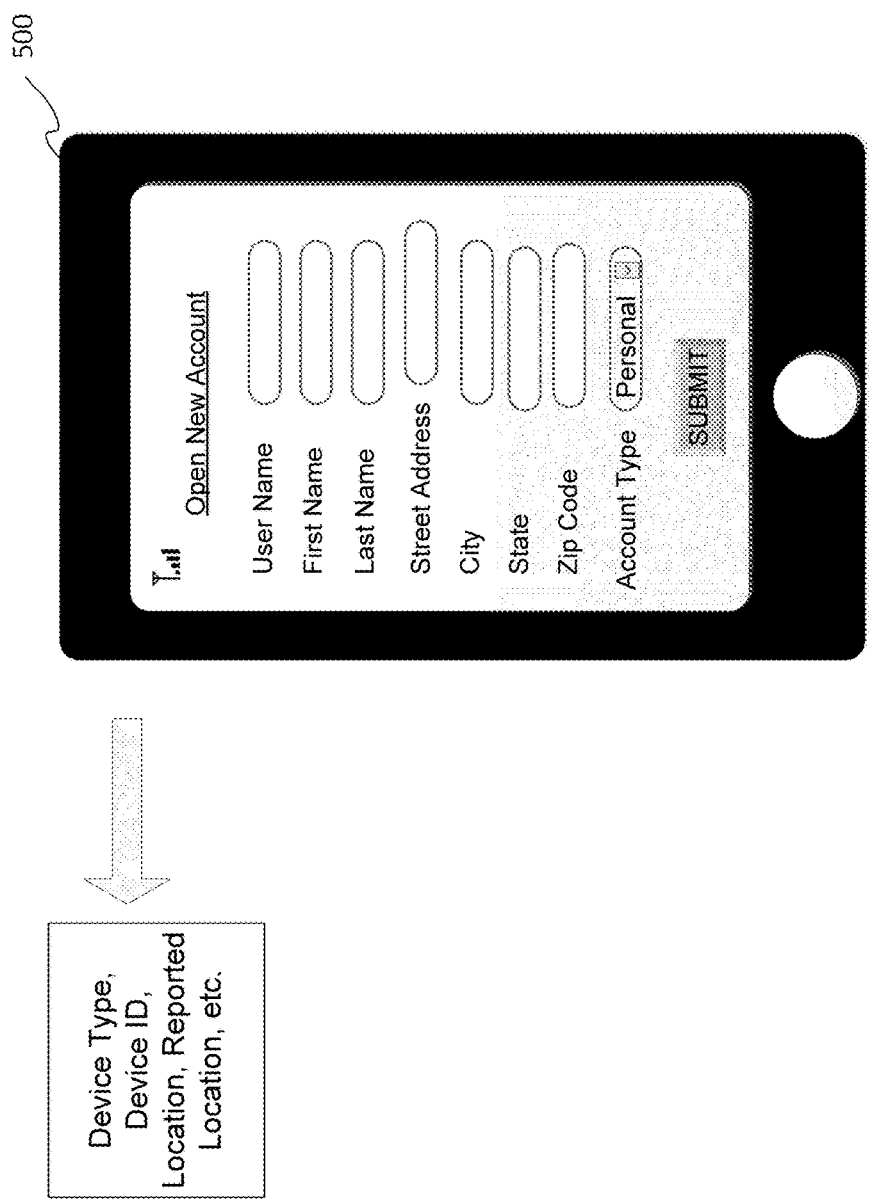
FIG. 5 is an illustrative user interface that may be generated and presented to a mobile consumer, which includes questions presented to the consumer for the purpose of opening a new account and also tools that gather mobile device and related information.

FIG. 5 is an illustrative mobile user interface 500 that may be generated and presented to a mobile consumer, which includes questions presented to the consumer for the purpose of opening a new account and also tools that gather mobile device and related information. The authentication system 101 and/or the authentication interface module 110 may be used to implement systems and methods described in this disclosure. The term "mobile user interface" here may include user interface generated and presented to a user of a mobile computing device, such as laptop, mobile phone, and/or tablets, and so forth.

The user interface 500 may include questions for a consumer so that the consumer may start the process of authentication. The information gathered may include: user name, first name, last name, street address, city, state, zip code, and/or account type, which may be personal or business.

As shown in FIG. 5, information regarding the mobile computing device's device type, device ID, location, reported location, and so forth, may be gathered by an authentication system 101 in order to generate authentication questions. Any discrepancies between a location of the mobile computing device and its reported location may trigger a higher risk score or risk level, so that in some embodiments, more difficult authentication questions may be presented to the consumer.

Example Method of Generating a Risk Score

Figure 6:
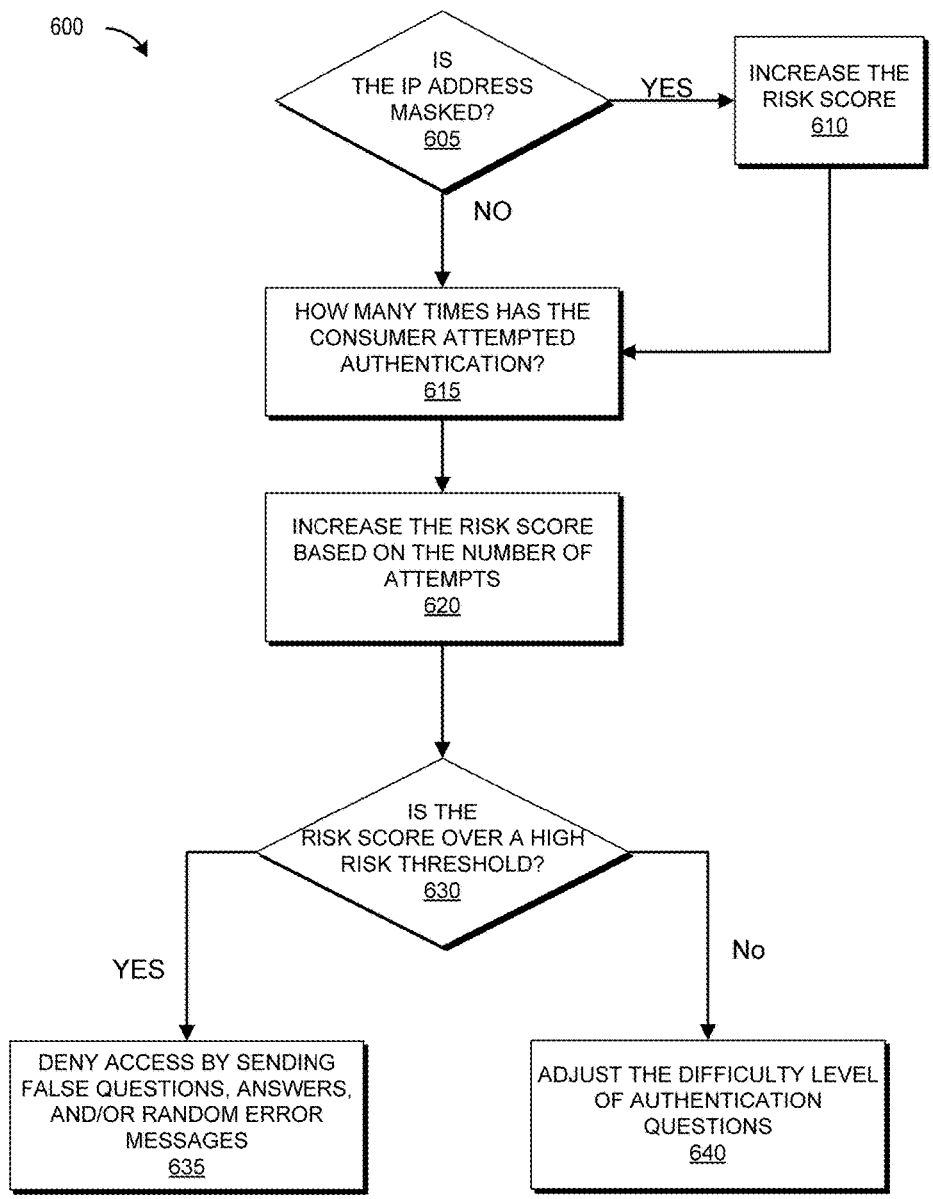
FIG. 6 is a flowchart that illustrates one embodiment of determining a risk score and using the risk score to determine whether a consumer's fraud risk is so high that the system will refuse to authenticate the consumer.

FIG. 6 is a flowchart that illustrates one embodiment of determining a risk score and using the risk score to determine whether a consumer's fraud risk is so high that the system will refuse to authenticate the consumer. The method of FIG. 6 may be performed by the authentication system 101 and/or via any other suitable computing system. Depending on the embodiment, the method may include fewer or additional blocks and/or the blocks may be performed in order different than is illustrated.

The method 600 begins at decision block 605, wherein the system determines whether the consumer's IP address is masked. If the consumer has a masked IP address and/or the masked IP address's geolocation does not match the consumer's real geolocation, the method 600 proceeds to block 610 and increase the risk score of the consumer. For example, if a person uses a proxy service that is available for free or for a fee (so that the person can connect to a proxy server first and direct all internet traffic through the proxy server), his or her real IP address would be hidden. Instead, the proxy server's IP address will be show. The device identification module 109 may determine that the device's purported address is really just a proxy server's IP address by looking up the purported IP address in a data store of known proxy server addresses. If so, the device identification module 109 may be configured to automatically notify the risk calculation module 122 so the risk level associated with the device can be adjusted. Moreover, if the proxy server's IP address is associated with a known malicious group for identity theft or other related crimes or violations, the risk calculation module 122 may adjust the risk level accordingly. However, if the proxy server's IP address is associated with a known cloud-service provider that provides virtual computing capacities to companies or a known employer which masks all of their employee's IP addresses, the device identification module 109 may determine that the device is affiliated with a known organization with low risk. The risk calculation module 122 may then adjust the risk level accordingly.

If the consumer does not have a masked IP address, the method 600 may proceed to block 615 and determine how many times the consumer has attempted authentication before. In some embodiments, the system may derive the information based on information in a data store. In some other embodiments, the system may derive the information based on real-time and/or number of attempts in a recent session. Alternatively, the system may also count the number of times the consumer has attempted authentication in a given period of time, e.g., in the last two months, the last week, the last year, etc., such as based on authentication requests from various other service providers.

The method 600 proceeds to block 620, wherein the consumer's risk score is increased based on the number of attempts. For example, the system may increase the risk score of the consumer by one for each unsuccessful attempt. In some embodiments, the system may assign different weight based on how recent the failed authentication attempt was. For example, a very recent attempt would have a weight higher than a more distant failed attempt to authenticate. Further, in some embodiments, the system may use other formulae to increase the risk score based on the number of past attempts to authenticate. The formulae used may be, for example, based on a risk of fraud analysis modeled using normal distribution, binomial distribution, etc.

In some embodiments, the method 600 proceeds to decision block 630 wherein it is determined whether the risk score is over a pre-determined high risk threshold. For example, if the risk score of the consumer is higher than the pre-determined high risk threshold, the risk that the consumer is committing authentication fraud may be deemed too high to be acceptable by the system and/or an entity requesting authentication (e.g., each entity requesting authentication may require different levels of authentication). In such situations, the method 600 proceeds to block 635, wherein the risk information is communicated to a requesting entity, such as to deny opening of an account.

However, if the risk score of the consumer is not so high as to be more than the high risk threshold as determined in the block 630, the method 600 proceed to block 640, wherein the difficulty level of the authentication questions are determine/adjusted based on the determined risk score. Once the authentication question difficulty is determined (e.g., block 640), the authentication questions may be asked of the consumer, via direct communication between the authentication system and the consumer and/or communication between the authentication system and the consumer via a service provider. In some embodiments, the method of FIG. 6, or certain blocks of FIG. 6, may be performed as authentication questions are being provided to the consumer, such that at block 648 previously determined authentication question difficulty level or quantity may be adjusted based on previous responses, device identification information, and/or determine behaviors of the consumer.

Figure 7:
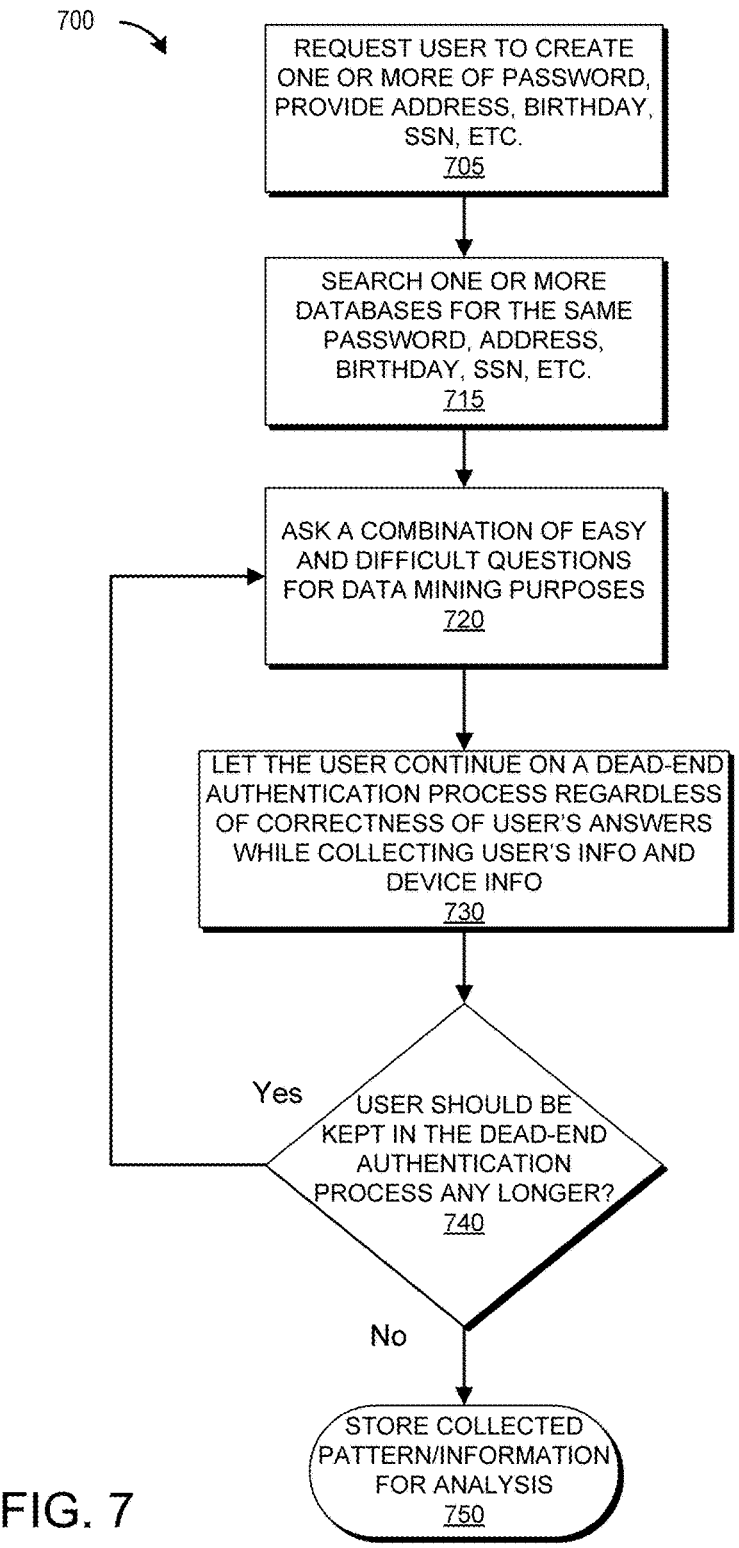
FIG. 7 is a flowchart that illustrates one embodiment of tracking behavior of a user with high fraud risk and leading the user to a dead-end authentication process.

Example Method of Dead-End Authentication and Collecting Information from High Fraud Risk Consumers FIG. 7 is a flowchart that illustrates one embodiment of tracking behavior of a user with high fraud risk and leading the user to a dead-end authentication process. The method of FIG. 7 may be performed by the authentication system 101 and/or via any other suitable computing system. Depending on the embodiment, the method may include fewer or additional blocks and/or the blocks may be performed in order different than is illustrated.

The method 700 begins at block 705, wherein the authentication system 101, through a user interface or an operator at a call center, requests a consumer who is deemed to be involved with a high risk of fraud, to do one or more of the following: create a password, provide an address, birth date, Social Security Number (SSN), and so forth. The method 700 then proceeds to block 715, wherein the authentication system 101 searches one or more databases using the information provided by the consumer, including searching the database for the same password, address, birthday, SSN, and so forth. The method 700 may store the information provided by the user and in particular, record if any hits or results were returned based on the results of the search. Such information may be used by the authentication system 101 to identify the same high risk user again in the future.

The method 700 proceeds to block 720, wherein the authentication system 101 requests the consumer to answer a combination of easy and difficult questions for purposes of collecting more data from the consumer. The questions asked by the authentication system 101 may be similar to typical authentication questions used by the system so that the consumer does not suspect that these questions were asked for purposes of collecting information from him/her. An embodiment of an easy question may be "What is your mother's maiden name?" An embodiment of a more difficult question may include "What is the name of the city you live in when you were 21 years old?"

The method 700 then proceeds to block 730, wherein the authentication system 101 lets the consumer continue on the dead-end authentication process, regardless of correctness of the user's answers. The authentication system 101 collects the consumer's answers, information, and information about the consumer's device. The authentication system 101 may do this in order to find out more about the potentially high risk consumer and better identify characteristics of such high risk consumers in the future.

The method 700 then proceeds to block 740, wherein the authentication system 101 determines whether the user should be kept in the dead-end authentication process any longer. Depending on the embodiment, the authentication system 101 may use a variety of criteria to make this decision. For example, the authentication system 101 may determine that enough information about the consumer and the consumer's device has been collected so that the consumer should not be kept in the dead-end authentication process anymore.

In some other embodiments, the authentication system 101 may determine that the consumer has not answered enough questions about his or her physical location or past credit history. Therefore, the authentication system 101 may decide to keep the consumer in the dead-end authentication process until the authentication system 101 has collected enough physical location or past credit history information.

If the answer to the question in decision block 740 is yes (that is, the consumer should be kept in the dead-end authentication process), the method 700 proceeds back to block 720, wherein the system again prompts the user to answer questions for data mining and data collection purposes.

However, if the answer to the question in decision block 740 is no (that is, the consumer does not need to be kept in the dead-end authentication process), the method 700 proceeds to block 750, wherein the authentication system 101 stores the collected information and usage patterns of the consumer in order to analyze the consumer's behavior. For example, if the password provided by this consumer is a non-trivial combination of characters, numbers, and symbols, such passwords may be used to detect whether this unusual password is reported as used in other instances. If a match is found, the authentication system 101 may submit such information for further analysis to determine whether the other instances involve a high risk of fraud as well.

FIG. 8A is an illustrative user interface 800 that may be generated and presented to a consumer that is determined to be involved in potentially fraudulent authentication. In this example, the user interface 800 is presented in a browser on a consumer's mobile computing device. However, the user interface may also be presented in an application or other types of user interfaces that can be used on a consumer's laptop, desktop, tablet, and other mobile computing devices. The authentication system 101, via the authentication interface module 112, may generate and present this user interface to a consumer who is may be involved with a high fraud risk. The user interface 800 may generate a message that communicates to the consumer that the two passwords entered by the consumer during the authentication process do not match, when in fact the passwords matched each other. The user interface 800 may request the consumer to enter the password, re-confirm it, and provide an alternative email. A consumer who is involved with a high risk of fraud may use another password that is different from the ones previously entered. The authentication system 101 may collect the additional passwords in order to maximize the amount of information that the system can receive from this potentially high risk consumer for data mining and analysis purposes.

Similarly, FIG. 8B is an illustrative user interface 850 that may be generated and presented to a user who is determined to be involved in potentially fraudulent authentications for purposes of capturing information from the user. As in FIG. 8B, the authentication system 101 may request the user to provide his or her address, regardless of whether the information previously provided by the user was correct or not. Such address information collected from the high fraud risk consumer may be used for risk analysis purposes.

FIG. 8C is an illustrative user interface 870 that may be generated and presented to a user who is determined to be involved in potentially fraudulent authentication so that at the end of authentication, the user is not provided with any hints regarding how to succeed in future fraudulent attempt to authenticate or any hints that the user has stepped into a honeypot. At the end of the authentication process, the authentication system 101 may provide a random error message so that a consumer with a potentially high risk of fraud may receive the random error message. The consumer, receiving a message such as "server error," may not suspect that he or she has been the target of a fraud analysis.

Another benefit of providing such a message using the illustrative user interface 870 is that the authentication system 101 will not let the consumer know what part of his or her answer triggered the system to detect his or her potential fraud. Minimizing such identifying information to the consumer may help minimize risk of providing useful information to a consumer with high risk of fraud so that the consumer is likely to find a way to get around the authentication system 101 in the future.

The illustrative user interface 870 may also provide a link back to a special version of the user interface so that if the consumer wants to be authenticated again, the consumer will be kept in the special version of the user interface for data collection and analysis process. The special version of the user interface may help ensure that the consumer or a device associated with the consumer's IP address can be quarantined in the dead-end authentication process should the consumer attempts authentication again. This may help minimize the risk that the consumer may get around the authentication system 101 in the future as well.

Figure 9:
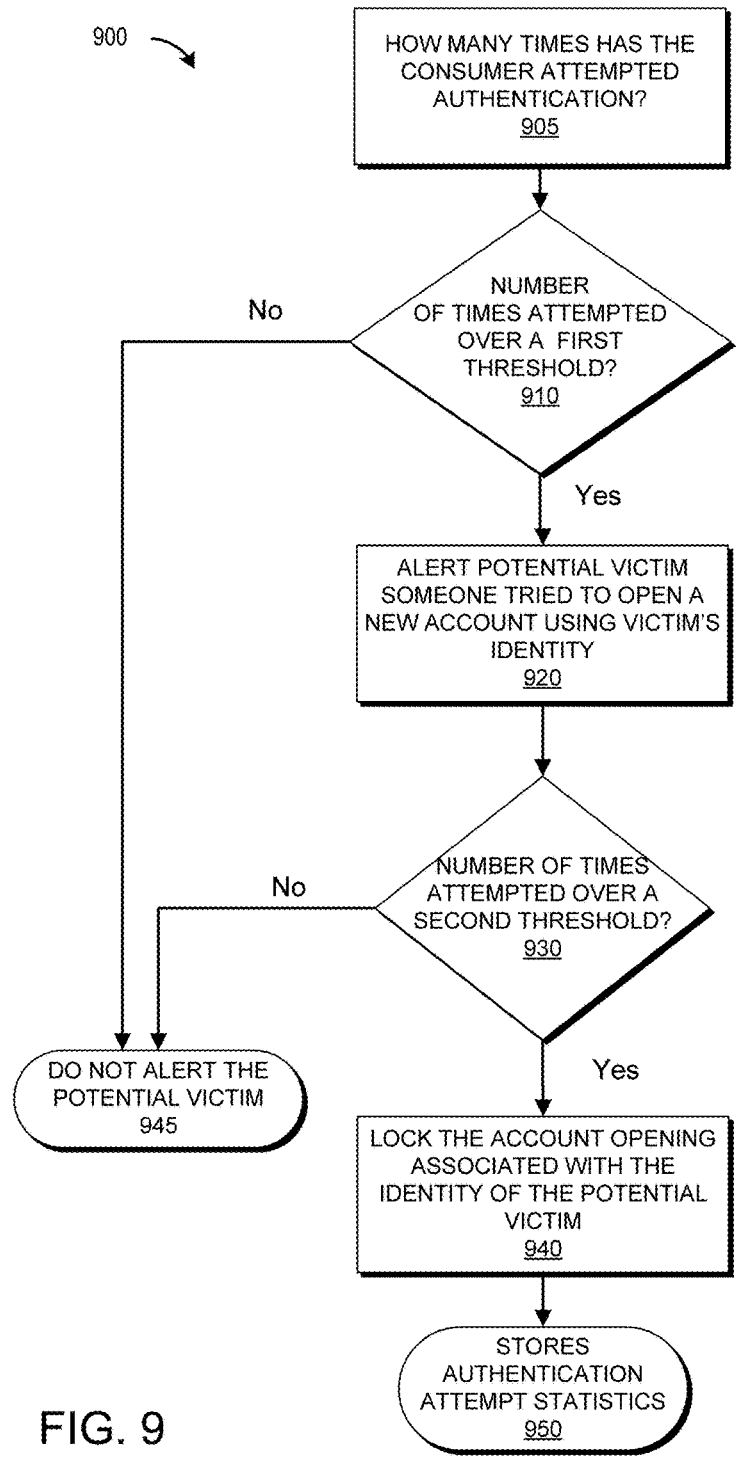
FIG. 9 is a flowchart that illustrates one embodiment of a method of alerting a consumer that potentially fraudulent authentication was attempted and storing information collected from the authentication session.

FIG. 9 is a flowchart that illustrates one embodiment of alerting a consumer that potentially fraudulent authentication was attempted and storing information collected from the authentication session. The method 900 starts at block 905, wherein the authentication system 101 determines how many times the consumer has attempted authentication. In some embodiments, instead of only determining a total amount of times attempted, the system may also determine the frequency of such attempts within a period of time.

The method 900 proceeds to decision block 910, wherein the authentication system 101 determines whether the number of times authentication has been attempted by the consumer exceeds a first threshold. If the answer to the question in decision block 910 is no, then the method 900 proceeds to block 945 and ends without alerting a potential victim of fraud because the number of attempts have not arisen to a level that is above the first threshold.

If the answer to the question in decision block 910 is yes, that is, the number of attempted authentications has exceeded the first threshold, then the method 900 proceeds to block 920, wherein the authentication system 101 sends an alert to the victim (e.g., the consumer whose identity is included in the attempted authentication) and let the victim know that someone has tried to open a new account using the victim's identity.

The method 900 then proceeds to decision block 930, wherein the authentication system 101 determines whether the number of times authentication has been attempted by the consumer exceeds a second threshold, which is higher than the first threshold. If the answer to the question in decision block 930 is no, then the method 900 proceeds to block 945 and ends without sending a second alert to a potential victim of fraud because the number of attempts have not arisen to a level that is above the second threshold.

However, if the answer to the question in decision block 910 is yes, that is, the number of attempted authentications has exceeded the second threshold, then the method 900 proceeds to block 940, wherein the authentication system 101 locks new account opening opportunities involved with identity of the potential fraud victim. Depending on the risk involved and the embodiment, the period of time that the victim's account is locked may vary. Once the victim's account is locked, no new account may be opened using the identity of the victim until the lock is released.

The method 900 then proceeds to block 950, wherein the authentication system 101 stores the statistics related to authentication attempts. The statistics may help adjust the first and second threshold used by the authentication system 101 in the future.

Other Embodiments

Although the foregoing systems and methods have been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

What is claimed is:

1. A computer system for setting authentication requirements for a consumer associated with a consumer computing device, the computing system comprising:
    a consumer computing device through which financial account information of a consumer is accessible;
    an authentication server in communication with a plurality of electronic devices to provide authentication of users of respective electronic devices;
    a financial services server in communication with the consumer computing device, the financial services server storing information regarding financial accounts issued to respective consumers by a financial service provider;
    wherein the financial services server executes software instructions to:
        receive, from the consumer computing device via the Internet, a request to open a new financial account with the financial service provider;
        transmit device identification information gathering code to the consumer computing device, the device identification information gathering code comprising one or more of device-aware parameter-submitting code, browser information gathering code, or device information gathering code;
        receive device identification information associated with the consumer computing device gathered through the device identification information gathering code, the device identification information comprising one or more of:
            device ID,
            device location,
            browser type,
            browser time zone,
            browser language settings,
            proxy settings,
            stated IP address, or
            real IP address; and
        transmit, to the authentication server, a request to set authentication requirements for the consumer and information allowing the authentication server to communicate with the consumer computing device;
    wherein the authentication server:
        receives, from the financial services server via the Internet, the request to set authentication requirements for the consumer in response to the request transmitted from the consumer computing device to open the new financial account and device identification information associated with the consumer computing device, wherein an identity of the consumer is unknown to the financial service provider;
        determines a real geolocation of the consumer computing device based on one or more of current GPS data or historical GPS data from the consumer computing device;
        derives one or more behaviors of the consumer based on at least the device identification information, the one or more behaviors comprising one or more of:
            a comparison between a masked geolocation indicating a location of a proxy server through which the device identification information is received and the determined real geolocation of the consumer computing device, or
            a comparison between the determined real geolocation of the consumer computing device and a browser geolocation indicated by a browser executing on the consumer computing device;
        calculates a fraud risk score of the consumer based at least on the one or more derived behaviors of the consumer, wherein respective derived behaviors indicative of potential fraud cause the fraud risk score to increase and respective derived behaviors not indicative of potential fraud cause the fraud risk score to decrease;
        determines authentication requirements for the consumer based on the calculated fraud risk score, wherein the authentication requirements indicate one or more of:
            a number of authentication questions the consumer is required to correctly answer,
            types of authentication questions the consumer is required to answer, or
            a percentage of authentication questions that must be correctly answered;
        transmits one or more authentication questions to the consumer computing device in accordance with the determined authentication requirements, and receives corresponding responses from the consumer computing device;
        determines, based on the authentication requirements for the consumer and the responses from the consumer computing device, whether the consumer is authenticated; and
        transmits, to the financial service server, an indication of whether the consumer is authenticated.

2. The computer system of claim 1, wherein the fraud risk score comprises a risk level.

3. The computer system of claim 1, wherein the fraud risk score comprises a risk factor.

4. The computer system of claim 1, wherein the request to open a new financial account for a consumer is received from a consumer.

5. The computer system of claim 1, wherein the request to open a new financial account for a consumer is received from a service provider.

6. The computer system of claim 1, wherein the one or more behaviors of the consumer is derived based on one or more of:
 a frequency of attempts to open a new financial account;
 whether requests for a new financial account for a same consumer originate from more than one computing device;
 whether the consumer computing device has a device IP address that matches a known IP address associated with a high fraud risk score; or
 whether a submitted password matches a unique password known to be related to a high fraud risk score.

7. The computer system of claim 1, wherein the financial services server further executes software instructions to:
 embed instructions to collect the device identification information; and
 process information collected from the embedded instructions.

8. The computer system of claim 1, wherein the authentication server further:
 upon a determination that the consumer has a fraud risk score above a first threshold, requests the consumer to provide information comprising at least one of: address, password, birthday, social security number;
 records the information about the consumer and the device identification information;
 upon a determination that more information needs to be collected from the consumer, requests the consumer to provide information; and
 upon a determination that more information does not need to be collected from the consumer, generates an error message to the consumer.

9. The computer system of claim 1, wherein the authentication server further:
 upon a determination that a total number of authentication attempts exceeds a first threshold, sends an alert to a victim of authentication fraud, the alert comprising information regarding the total number of authentication attempts; and
 upon a determination that the total number of authentication attempts exceeds a second threshold, temporarily locks the account of the victim of authentication fraud.

10. A system comprising:
 a computer-readable storage medium for the financial services server comprising computer-executable instructions that direct the financial services server to:
  store information regarding financial accounts issued to respective consumers by a financial service provider;
  receive, from a consumer computing device via the Internet, a request to open a new financial account with the financial service provider;
  transmit device identification information gathering code to the consumer computing device, the device identification information gathering code comprising one or more of device-aware parameter-submitting code, browser information gathering code, or device information gathering code;
  receive device identification information associated with the consumer computing device gathered through the device identification information gathering code, the device identification information comprising one or more of:
   device ID,
   device location,
   browser type,
   browser time zone,
   browser language settings,
   proxy settings,
   stated IP address, or
   real IP address; and
  transmit, to the authentication server, a request to set authentication requirements for the consumer and information allowing the authentication server to communicate with the consumer computing device;
 a computer-readable storage medium for the authentication server comprises computer-executable instructions that direct the authentication server to:
  receive, from the financial services server via the Internet, the request to set authentication requirements for the consumer in response to the request transmitted from the consumer computing device to open the new financial account and device identification information associated with the consumer computing device, wherein an identity of the consumer is unknown to the financial service provider;
  determine a real geolocation of the consumer computing device based on one or more of current GPS data or historical GPS data from the consumer computing device;
  derive one or more behaviors of the consumer based on at least the device identification information, the one or more behaviors comprising one or more of:
   a comparison between a masked geolocation indicating a location of a proxy server through which the device identification information is received and the determined real geolocation of the consumer computing device, or
   a comparison between the determined real geolocation of the consumer computing device and a browser geolocation indicated by a browser executing on the consumer computing device;
  calculate a fraud risk score of the consumer based at least on the one or more derived behaviors of the consumer, wherein respective derived behaviors indicative of potential fraud cause the fraud risk score to increase and respective derived behaviors not indicative of potential fraud cause the fraud risk score to decrease;
  determine authentication requirements for the consumer based on the calculated fraud risk score, wherein the authentication requirements indicate one or more of:
   a number of authentication questions the consumer is required to correctly answer,
   types of authentication questions the consumer is required to answer, or
   a percentage of authentication questions that must be correctly answered;
  transmit one or more authentication questions to the consumer computing device in accordance with the determined authentication requirements, and receives corresponding responses from the consumer computing device;
  determine, based on the authentication requirements for the consumer and the responses from the consumer computing device, whether the consumer is authenticated; and
  transmit, to the financial service server, an indication of whether the consumer is authenticated.

11. The non-transitory computer-readable storage medium system of claim 10, wherein the fraud risk score comprises a risk level.

12. The non-transitory computer-readable storage medium system of claim 10, wherein the fraud risk score comprises a risk factor.

13. The non-transitory computer-readable storage medium system of claim 10, wherein the executable instructions on the computer-readable storage medium for the authentication server further direct the authentication server to:
upon a determination that the fraud risk score associated with the consumer exceeds a first threshold, increase difficulty of questions the consumer is required to correctly answer.

14. The non-transitory computer-readable storage medium system of claim 10, wherein the executable instructions on the computer-readable storage medium for the authentication server further direct the authentication server to:
upon a determination that the fraud risk score associated with the consumer exceeds a second threshold, deny the request from the consumer to open the new financial account.

15. A computer-implemented method of setting authentication requirements for a consumer associated with a consumer computing device, the method comprising:
at a financial services server in communication with a consumer computing device, the financial services server storing information regarding financial accounts issued to respective consumers by a financial service provider, wherein financial account information of a consumer is accessible through the consumer computing device:
receiving, from the consumer computing device via the Internet, a request to open a new financial account with the financial service provider;
transmitting device identification information gathering code to the consumer computing device, the device identification information gathering code comprising one or more of device-aware parameter-submitting code, browser information gathering code, or device information gathering code;
receiving device identification information associated with the consumer computing device gathered through the device identification information gathering code, the device identification information comprising one or more of:
device ID,
device location,
browser type,
browser time zone,
browser language settings,
proxy settings,
stated IP address, or
real IP address; and
transmitting, to an authentication server, a request to set authentication requirements for the consumer and information allowing the authentication server to communicate with the consumer computing device;
at the authentication server, the authentication server in communication with a plurality of electronic devices to provide authentication of users of respective electronic devices:
receiving, from the financial services server via the Internet, the request to set authentication requirements for the consumer in response to the request transmitted from the consumer computing device to open the new financial account and device identification information associated with the consumer computing device, wherein an identity of the consumer is unknown to the financial service provider;
determining a real geolocation of the consumer computing device based on one or more of current GPS data or historical GPS data from the consumer computing device;
deriving one or more behaviors of the consumer based on at least the device identification information, the one or more behaviors comprising one or more of:
a comparison between a masked geolocation indicating a location of a proxy server through which the device identification information is received and the determined real geolocation of the consumer computing device, or
a comparison between the determined real geolocation of the consumer computing device and a browser geolocation indicated by a browser executing on the consumer computing device;
calculating a fraud risk score of the consumer based on at least the one or more derived behaviors of the consumer, wherein respective derived behaviors indicative of potential fraud cause the fraud risk score to increase and respective derived behaviors not indicative of potential fraud cause the fraud risk score to decrease;
determining authentication requirements for the consumer based on the calculated fraud risk score, wherein the authentication requirements indicate one or more of:
a number of authentication questions the consumer is required to correctly answer,
types of authentication questions the consumer is required to answer, or
a percentage of authentication questions that must be correctly answered;
transmitting one or more authentication questions to the consumer computing device in accordance with the determined authentication requirements, and receiving corresponding responses from the consumer computing device;
determining, based on the authentication requirements for the consumer and the responses from the consumer computing device, whether the consumer is authenticated; and
transmitting, to the financial service server, an indication of whether the consumer is authenticated.

16. The computer-implemented method of claim 15, wherein the computer-implemented method further comprising, at the authentication server:
upon an indication that the fraud risk score associated with the consumer exceeds a first threshold, recording the one or more behaviors of the consumer and the device identification information of the consumer;
matching, in a consumer information data store, any record that matches the one or more behaviors of the consumer and/or the device identification information of the consumer;
calculating a fraud risk score associated with the matched record.

* * * * *